US006477533B2

(12) United States Patent
Schiff et al.

(10) Patent No.: US 6,477,533 B2
(45) Date of Patent: Nov. 5, 2002

(54) SYSTEMS AND METHODS OF MAINTAINING CLIENT RELATIONSHIPS

(75) Inventors: Martin R. Schiff, Coral Springs, FL (US); Kathleen M. Sussman-Wiles, Miami Beach, FL (US); Vivian D. Ewart, Davie, FL (US); Wallace C. Huff, Dresser, WI (US); Byron J. Berk, Northborough, MA (US); Maureen J. Elenberger, Concord, MA (US); Timothy Fessenden, Waltham, MA (US); Paul Fitton, Hollis, NH (US); Vance M. Loiselle, Bolton, MA (US); Michael A. Carpenter, Loxahatchee, FL (US); Michael T. Sherota, Davie, FL (US); Elizabeth K. Judy, Marina Del Rey, CA (US); Elena M. Rodriquez, Miami, FL (US); Holley S. Christen, Syracuse, NY (US); Mitch Cox, Orlando, FL (US); Todd Elliott, Orlando, FL (US); Kevin Helms, Orlando, FL (US); Adolf Quintana, Orlando, FL (US); Dot Tolle, Casselberry, FL (US); Nancy Porter, St. Cloud, FL (US); Karen J. Reynolds, Orlando, FL (US); Monica Scanlon, New York, NY (US); Paul Colangelo, Airmont, NY (US); Tracey Lee Codd, Pt. Charlotte, FL (US); Joanell U. DeLand, Clay, NY (US); Timothy M. Moorhead, Syracuse, NY (US); Anne D. Burkard, Delray Beach, FL (US); George DelPino, Coral Springs, FL (US); Joelle S. Delva, Miami, FL (US); Sharon Everhart-Brooks, Boca Raton, FL (US); Bradley Ferguson, Boca Raton, FL (US); David A. Forman, Deerfield Beach, FL (US); Samuel L. Hintz, Coral Springs, FL (US); Irwin D. Klotz, Boca Raton, FL (US); Courtney W. T. Kurk, Miami Beach, FL (US); Keith J. Leslie, Plantation, FL (US); Sandi B. Levy, Deerfield Beach, FL (US); Fred Locicero, Smithtown, NY (US); Charlotte A. Luna, Boca Raton, FL (US); Jeffrey A. Nickerson, Coconut Creek, FL (US); Maryann Bastnagel, Rockville, MD (US)

(73) Assignee: Travel Services International, Inc., Delray Beach, FL (US)

( * ) Notice: Subject to any disclaimer, the term of this patent is extended or adjusted under 35 U.S.C. 154(b) by 0 days.

(21) Appl. No.: 09/728,584

(22) Filed: Dec. 1, 2000

(65) Prior Publication Data

US 2002/0022977 A1 Feb. 21, 2002

(Under 37 CFR 1.47)

Related U.S. Application Data

(60) Provisional application No. 60/168,871, filed on Dec. 3, 1999.

(51) Int. Cl.[7] .............................................. G06F 17/30
(52) U.S. Cl. .............................. 707/10; 705/5; 705/14; 705/26
(58) Field of Search ............................. 707/10; 705/14, 705/ 5, 26; 395/205; 701/201; 364/401

(56) References Cited

U.S. PATENT DOCUMENTS

| | | | | | |
|---|---|---|---|---|---|
| 5,483,444 | A | * | 1/1996 | Heintzeman et al. | 364/401 |
| 5,648,900 | A | * | 7/1997 | Bowen et al. | 395/205 |
| 5,732,398 | A | * | 3/1998 | Tagawa | 705/5 |
| 5,948,040 | A | * | 9/1999 | DeLorme et al. | 701/201 |
| 6,023,679 | A | * | 2/2000 | Acebo et al. | 705/5 |
| 6,041,308 | A | * | 3/2000 | Walker et al. | 705/14 |
| 6,085,169 | A | * | 7/2000 | Walker et al. | 705/26 |
| 6,108,639 | A | * | 8/2000 | Walker et al. | 705/26 |
| 6,134,534 | A | * | 10/2000 | Walker | 705/26 |
| 6,182,052 | B1 | * | 1/2001 | Fulton et al. | 705/26 |

OTHER PUBLICATIONS

Laura Q. Hughes, "With the help of TSI and the major CRSs, agents can not link up with cruise suppliers electronically," Travel Agent, Mar. 22, 1999, pp. 52 and 56.

"TSI Launches Cruise Res System," Cruise Week, Jan. 6, 1999, p. 001.

"Travel Services International rolls out first of four new res applications," Travel Distribution Report, vol. 6, No. 18, Dec. 3, 1998, pp. 1 and 5.

Brian Major, "Travel Services International is looking to put a hold on the cruise industry with new technology," Travel Agent, Nov. 30, 1998, pp. 39.

"Travel Co. strengthens its bid to become a one–stop shop," Aug. 27, 1998, pp. 11.

Marguerite M. Plunkett, "Agency's software scans for lowest airfare," Palm Beach Post, Jul. 29, 1998, pp. 5B.

"TSI developing technology for agency sales, as well as consumer distribution," Travel Distribution Report, vol. 6, No. 2, Apr. 23, 1998, pp. 1 and 6–7.

Steve Zurier, "A Question of Balance," Internet Week, Feb. 15, 1999, pp. 35–37.

Brian Major & Laura Q. Hughes, "Secrets of Selling Sailings," Travel Agent, Nov. 23, 1998, pp. 102.

Linda Humphrey, "TSI Purchases Hotel Res System," Travel Weekly, vol. 57, No. 45, Section 1, Jun. 8, 1998, pp. 1 and 4.

Screen Shots from SABRE Cruise Director Program. Screen Shots taken Aug. 22, 2000. Printed pp. 1–10.

\* cited by examiner

*Primary Examiner*—Frantz Coby
(74) *Attorney, Agent, or Firm*—Knobbe Martens Olson & Bear, LLP

(57) ABSTRACT

In one embodiment, systems and methods are used to maintain client relationships by tracking and managing customers and agents involved in booking a cruise. Furthermore, various activities which take place between an agent and active customers are monitored, whereby the type and quantity of activities performed by the agent is evaluated to assign a period of time of ownership of the customer. During the period of time while the customer is owned, other agents are prevented from acquiring the customer and subsequent booking commission. A series of rules which determine the duration of ownership of the customer are maintained and applied to enable the ownership to be changed as needed.

23 Claims, 15 Drawing Sheets

FIG. 13

SYSTEMS AND METHODS OF MAINTAINING CLIENT RELATIONSHIPS

RELATED APPLICATIONS

This application claims the benefit of U.S. Provisional Application No. 60/168,871 filed Dec. 3, 1999, the disclosure of which is hereby incorporated by reference. In addition, this application is a continuation-in-part of U.S. patent application filed concurrently and entitled "SYSTEMS AND METHODS OF ON-LINE BOOKING OF CRUISES," internal reference number TRAVL.002A, which is hereby incorporated by reference.

FIELD OF THE INVENTION

The present systems and methods relate to on-line booking of cruises and in particular concern applications designed to facilitate cruise price comparisons, reservations, booking, and customer management by travel agents.

BACKGROUND

The growth of the cruise industry has created an increase in the number of passenger cruise lines that sail each year. Each cruise line offers a variety of cruise packages, and the cruise packages vary depending on destination, sailing date, cruise ship, cabin category, excursions, special discounts, and so forth. While such variety offers great selection to potential customers, finding the cruise package that best fits the customer's budget and preferences is often a difficult task. As a result, travel agents spend large amounts of time and energy researching and booking cruises for customers.

Conventional approaches in the cruise industry fail to recognize the travel agent's efforts in the cruise booking process. Travel agents are actively involved in the cruise booking process beginning with the initial customer contact (e.g., by telephone conversations, personal appointments, e-mail solicitations, etc.), extending to determining what the customer wants and scouring the cruise line industry to find acceptable cruise packages. By the time the agent has booked a cruise package for the customer, the agent has spent a significant amount of time with the customer. Such service is laborious and typically compensated by sales commission. While there are a number of customer information systems which have been used by travel agents to provide and manage customer contact information, these systems fail to track the travel agents' close involvement with their customers throughout the cruise selling and booking process. By relying on such systems, travel agencies and the agents working therein encounter customer management difficulties and inaccurate tracking of sales commission figures.

An additional problem with conventional approaches is that they fail to ensure that customers will be directed to agents with whom they have previously established a relationship. It is important that the customer receives the personal attention and recognition often available only from the travel agent with whom the customer has had previous contact, as the customer/agent relationship significantly impacts repeat business rate in the cruise industry.

An further problem with conventional approaches is that travel agents spend large amounts of time determining the preferences of each individual customer, finding cruise packages that meets the customer's needs, and booking the cruise package. A travel agent spends, on average, well over one hour with each customer manually sifting through piles of paper documentation and is constantly on the phone with cruise lines to get current information, such as availability and pricing.

Thus, conventional approaches fail to provide customer/agent tracking and management thereby reducing the number of potential customer cruise bookings. Furthermore, conventional approaches do not adequately protect the agent's customer pool leading to reduced commissions through inappropriate customer switching among agents.

SUMMARY OF THE INVENTION

One embodiment of the present invention is a system for tracking agent interaction with customers implemented in a web server environment wherein a plurality of remote users utilizing web browser programs electronically communicate with the system via a data communications network. The system comprises an electronic customer database configured to store information about a plurality of customers and an electronic agent database configured to store information about a plurality of agents. The system also comprises an electronic rules database configured to store rules that define temporal relationships between the plurality of customers and the plurality of agents and an agent ownership program module in communication with the customer database, the agent database, and the rules database, wherein the agent ownership program module is configured to control agent access to information about the plurality of customers in the customer database based at least upon the temporal relationships between the plurality of customers and the plurality of agents.

Another embodiment of the present invention is a method for managing agent ownership of customers utilizing a cruise web server environment to electronically communicate via a data communications network with a plurality of remote users using web browser programs. The method comprises receiving and agent identifier that represents an agent from a remote user's web browser program, receiving a customer identifier that represents a customer from the remote user's web browser program, and verifying that the customer is available for interaction with the agent by querying an electronic database of agent and customer information. The method also comprises receiving an agent activity from the remote user's web browser program and determining a time window for agent activity based at least upon at least one agent ownership rule, wherein the at least one agent ownership rule is stored in the electronic database. The method further comprises creating an agent of record association between the agent and the customer wherein the agent is designated as the customer's agent of record for the allotted amount of time and storing the agent of record association in the electronic database.

An additional embodiment of the present invention is a method of verifying agent ownership of a customer utilizing a cruise web server environment to electronically communicate via a data communications network with a plurality of remote users using web browser programs. The method comprises receiving an agent identifier representing an agent from a remote user's web browser program, receiving a customer identifier representing a customer from the remote user's web browser program, and retrieving a customer record from an electronic customer database, wherein the customer record corresponds to the customer and the customer record includes an agent of record. The method also comprises determining whether the agent of record corresponds to the agent represented by the agent identifier and returning a message to the remote user's web browser program signifying whether the agent of record corresponds to the agent represented by the agent identifier.

Another embodiment of the present invention is a method for changing an agent of record association between an agent and a customer utilizing a cruise web server environment to electronically communicate via a data communications network with a plurality of remote users using web browser programs. The method comprises receiving an agent identifier representing an agent from a remote user's web browser, receiving a customer identifier representing a customer from the remote user's web browser, and receiving an activity that represents a communication between the agent and the customer from the remote user's web browser. The method also comprises retrieving a customer record from an electronic database, wherein the customer record corresponds to the customer and the customer record includes an agent of record association, setting the agent of record association to correspond to the agent represented by the agent identifier, and storing the agent of record association in the electronic database.

An additional embodiment of the present invention is a method for tracking and maintaining relationships among clients and agents, wherein the method uses a web browser program to electronically communicate with a remote cruise web server system via a data communications network. The method comprises submitting an agent identifier that corresponds to an agent to the remote cruise web server system, submitting a customer identifier that corresponds to a customer to the remote cruise web server system, and receiving agent ownership information from the remote cruise web server system, wherein the agent ownership information corresponds to the customer and the customer's assigned agent signifying whether the agent may proceed with working with the customer.

Another embodiment of the present invention is a method for using an agent ownership system to update an existing relationship between clients and agents, wherein the method uses a web browser program to electronically communicate with a remote cruise web server system via a data communications network. The method comprises submitting an agent identifier that corresponds to an agent to the remote cruise web server system and submitting a client identifier to the remote cruise web server system that corresponds to a client with whom the agent has an existing relationship. The method also comprises submitting an agent activity to the remote cruise web server system and receiving a time period for which the relationship is valid from the remote cruise web server system.

An additional embodiment of the present invention is a method of identifying an agent of record utilizing a cruise web server environment to electronically communicate via a data communications network with a plurality of remote users using web browser programs. The method comprises receiving a customer identifier representing a customer from a remote user's web browser, retrieving a customer record from an electronic customer database, wherein the customer record corresponds to the customer identifier, and determining whether an agent of record has been assigned to the customer record. The method also comprises returning an agent of record designator to the remote user's web browser if the agent of record has been assigned and returning an available agent designator to the remote user's web browser if the agent of record has not been assigned.

Another embodiment of the present invention is a method for overriding an agent of record association between a first agent and a customer utilizing a cruise web server environment to electronically communicate via a data communications network with a plurality of remote users using web browser programs. The method comprises receiving an agent identifier representing a second agent from a remote user's web browser program, receiving a customer identifier representing a customer from the remote user's web browser program, and retrieving agent of record data corresponding to the customer identifier from an electronic database. The method also comprises setting the agent of record data to the agent identifier, receiving an expiration date from the remote user's web browser program, and retrieving agent of record data from the electronic database, wherein the agent of record data corresponds to the customer identifier. The method further comprises setting the agent of record data to correspond to the agent identifier and the expiration date and storing the agent of record data in the electronic database.

An further embodiment of the present invention is a method of creating an agent of record association between an agent and a customer utilizing a cruise web server environment to electronically communicate via a data communications network with a plurality of remote users using web browser programs. The method comprises receiving an agent identifier representing an agent from a remote user's web browser program, receiving customer information about a customer from the remote user's web browser program, and creating a customer record. The method also comprises creating an agent of record association between the customer and the agent and storing the customer record in an electronic database.

Another embodiment of the present invention is a system for tracking agent interaction with customers implemented in conjunction with a web browser program, wherein the web browser program electronically communicates with a remote cruise web server system via a data communications network. The system comprises an agent identifier program module configured to submit to the remote cruise web server system an agent identifier that corresponds to an agent and a client identifier program module configured submit to the remote cruise web server system a client identifier that corresponds to a client with whom the agent has an existing relationship. The system also comprises an agent activity program module configured to submit to the remote cruise web server system an agent activity wherein the agent activity corresponds to the agent identifier and the client identifier and a time program module configured to receive a time period for which the relationship is valid from the remote cruise web server system.

An additional embodiment of the present invention is a method for managing agent ownership of customers utilizing a cruise web server environment to electronically communicate via a data communications network with a plurality of remote users using web browser programs. The method comprises means for receiving and agent identifier that represents an agent from a remote user's web browser program, means for receiving a customer identifier that represents a customer from the remote user's web browser program, and means for verifying that the customer is available for interaction with the agent by querying an electronic database of agent and customer information. The method also comprises means for receiving an agent activity from the remote user's web browser program and means for determining a time window for agent activity based at least upon at least one agent ownership rule, wherein the at least one agent ownership rule is stored in the electronic database. The method further comprises means for creating an agent of record association between the agent and the customer wherein the agent is designated as the customer's agent of record for the allotted amount of time and means for storing the agent of record association in the electronic database.

Another embodiment of the present invention is a method for tracking and maintaining relationships among clients and agents, wherein the method uses a web browser program to electronically communicate with a remote cruise web server system via a data communications network. The method comprises means for submitting an agent identifier that corresponds to an agent to the remote cruise web server system, means for submitting a customer identifier that corresponds to a customer to the remote cruise web server system, and means for receiving agent ownership information from the remote cruise web server system, wherein the agent ownership information corresponds to the customer and the customer's assigned agent signifying whether the agent may proceed with working with the customer.

For purposes of summarizing the invention, certain aspects, advantages, and novel features of the invention are described herein. It is to be understood that not necessarily all such advantages may be achieved in accordance with any particular embodiment of the invention. Those skilled in the art will recognize that the invention may be embodied or carried out in a manner that achieves one advantage or a group of advantages as taught herein without necessarily achieving other advantages as may be taught or suggested herein.

BRIEF DESCRIPTION OF DRAWINGS

These and other features will now be described with reference to the drawings summarized below. These drawings and the associated description are provided to illustrate embodiments of the invention and not to limit the scope of the invention. Throughout the drawings, reference numbers are re-used to indicate correspondence between referenced elements. In addition, the first digit of each reference number indicates the figure in which the element first appears.

FIG. 13 illustrates one embodiment a customer search results display.

DETAILED DESCRIPTION

Figure 1:
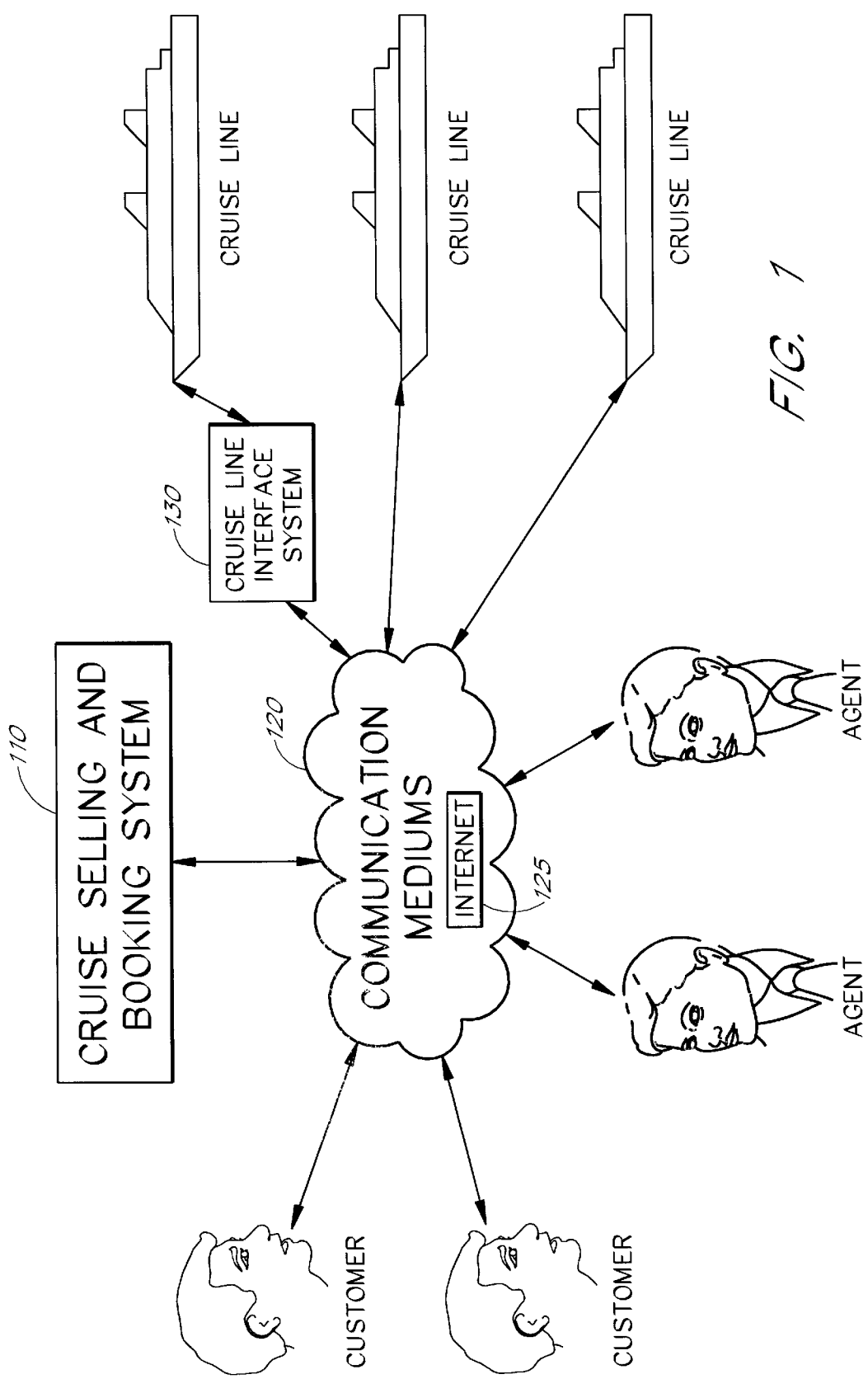
FIG. 1 illustrates a high-level block diagram of one embodiment of the present invention.

Systems and methods which represent various embodiments and example applications of the invention will now be described with reference to the drawings. Variations to the systems and methods which represent other embodiments will also be described. In one disclosed embodiment, the systems and methods are used to maintain customer/agent relationships and are described in the context of a cruise selling and booking system. The inventors contemplate that the present invention is not limited by the type of environment in which the client relationships are maintained, and that other types of environments may be used, such as, for example, a real estate system, an airline travel system, a car rental system, a car sales system, and so forth. The figures and descriptions, however, relate to embodiments of the invention wherein the relationship is between a customer and a cruise booking agent.

The present invention relates to systems and methods for maintaining customer/agent relationships. One embodiment of the invention includes a system and method for maintaining these relationships based upon a series of rules and permissions that define the association and duration of the customer/agent relationships thereby establishing the notion of agent ownership of customers for a specified time period. More specifically, these rules and permissions may create and maintain an agent of record relationship in which a customer is matched to an agent based on various activities and transactions that typically occur during the cruise selling and booking process. These activities may include customer/agent interactions, such as, for example, conversations, price lookups, reservations, bookings, and payments.

In one embodiment, the agent of record relationship may exist for a period of time dependent on the nature and duration of the customer/agent interaction. In one aspect, the duration of time which the agent of record relationship exists may prevent the agent's customer from being solicited by other agents who may not have devoted similar amounts of time to working with the customer. In other embodiments, other agents may be able to work with another agent's customer, but are precluded from receiving commission for such work.

One benefit of one embodiment is that the agent of record relationship personalizes the customer experience and reduces the amount of time the customer spends with multiple agents. This relationship benefits the customer by preventing the reiteration of information already presented because the customer is directed to the agent with whom he is already familiar.

Another benefit of one embodiment is that the agent of record relationship further provides the agent with incentive to follow up with customer, throughout the booking process and beyond the benefit of commission, by establishing long term benefits should the agent book a cruise for the customer. Also, the agent of record relationship provides an incentive to move the customer through the booking process in a timely manner as the customer is made available to a general pool of agents should the agent of record not maintain sufficient interaction with the customer.

An additional benefit of one embodiment is that the travel agent is able to manage agent/customer relationships in a more efficient manner saving the travel agent and the customer's time.

In one embodiment, these features are integrated into a cruise selling and booking system that automatically manages the administrative tasks used to determine the customers to which an agent has exclusive access. Furthermore, the cruise selling and booking system includes a series of functions to help the agent maintain ownership of customers by ensuring timely customer follow-up and booking of cruises. It is recognized, however, that in other embodiments, the agent of record relationships may be integrated into other types of systems.

I. Overview

In one embodiment, the systems and methods may be used in the context of a cruise selling and booking system 110. FIG. 1 illustrates the cruise selling and booking system 110 of one embodiment wherein a plurality of customers, agents, and cruise lines interact with a cruise selling and booking system 110 via communication mediums 120 such as the Internet 125. Cruise lines may interact directly with the cruise selling and booking system 110 and/or via a cruise line interface system 130 that stores information for one or more cruise lines. The cruise selling and booking system 110, in the illustrated embodiment, provides an interactive tool for compiling, reviewing, and processing information obtained from the cruise lines, customers, and agents. The customer is provided with information about various cruises packages and may book a cruise package utilizing components of the cruise selling and booking system 110 through interaction with an agent.

Figure 2A:
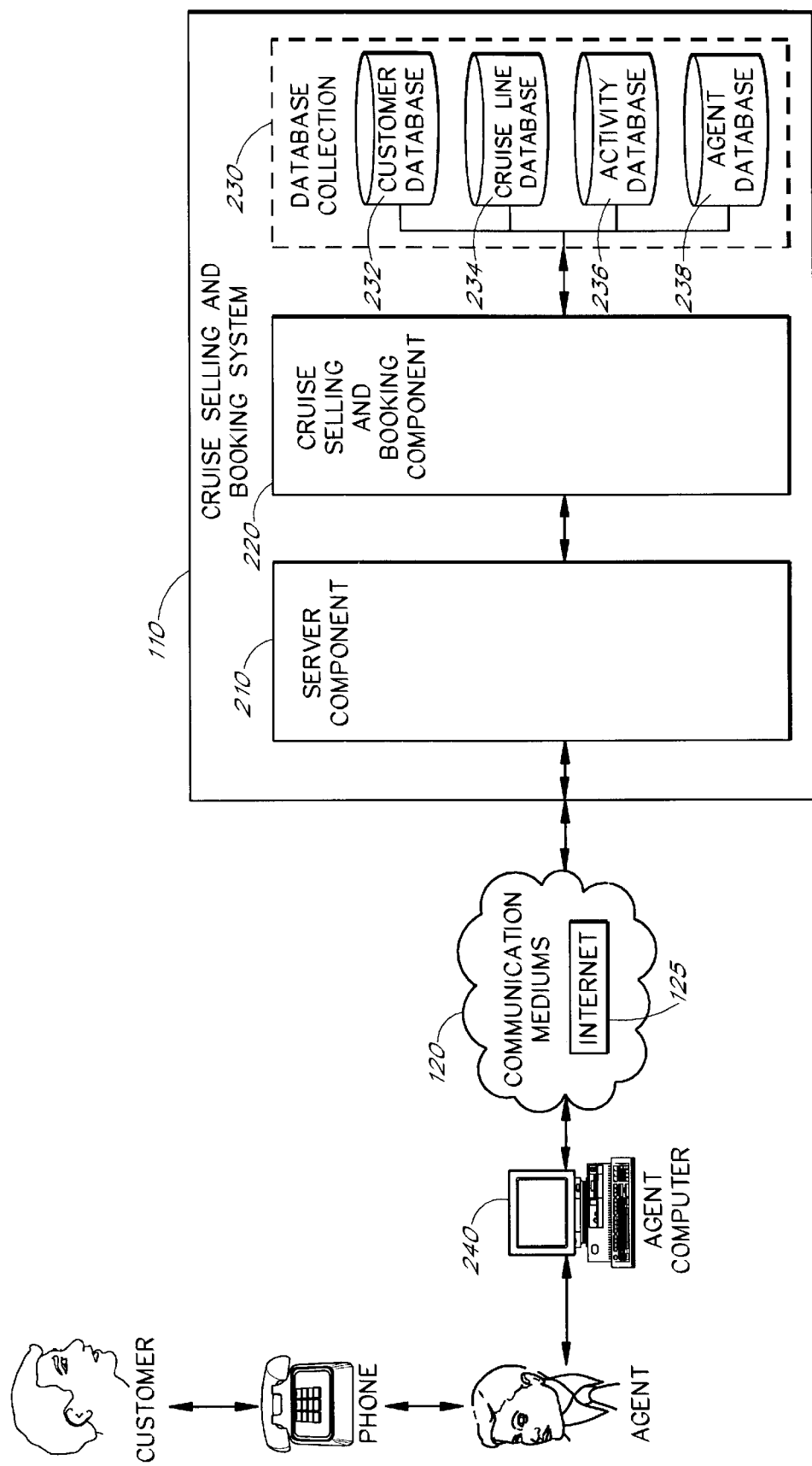
FIG. 2A illustrates a high-level block diagram of one embodiment of the present invention.

Using the agent computer 240, as illustrated in FIG. 2A, the agent accesses the components of the cruise selling and booking system 110 to find information about the customer, to provide the customer with information about cruise sailings from the cruise line database 234, and to book cruise packages as desired by the customer. Additionally, the agent may collect and store information about the customer in the customer database 232 and may further access resources of the agent database 238. In one embodiment, the agent database 238 stores information relating to the agents and their customers allowing the agents to better manage customer communication, scheduling, and interactions.

Figure 2B:
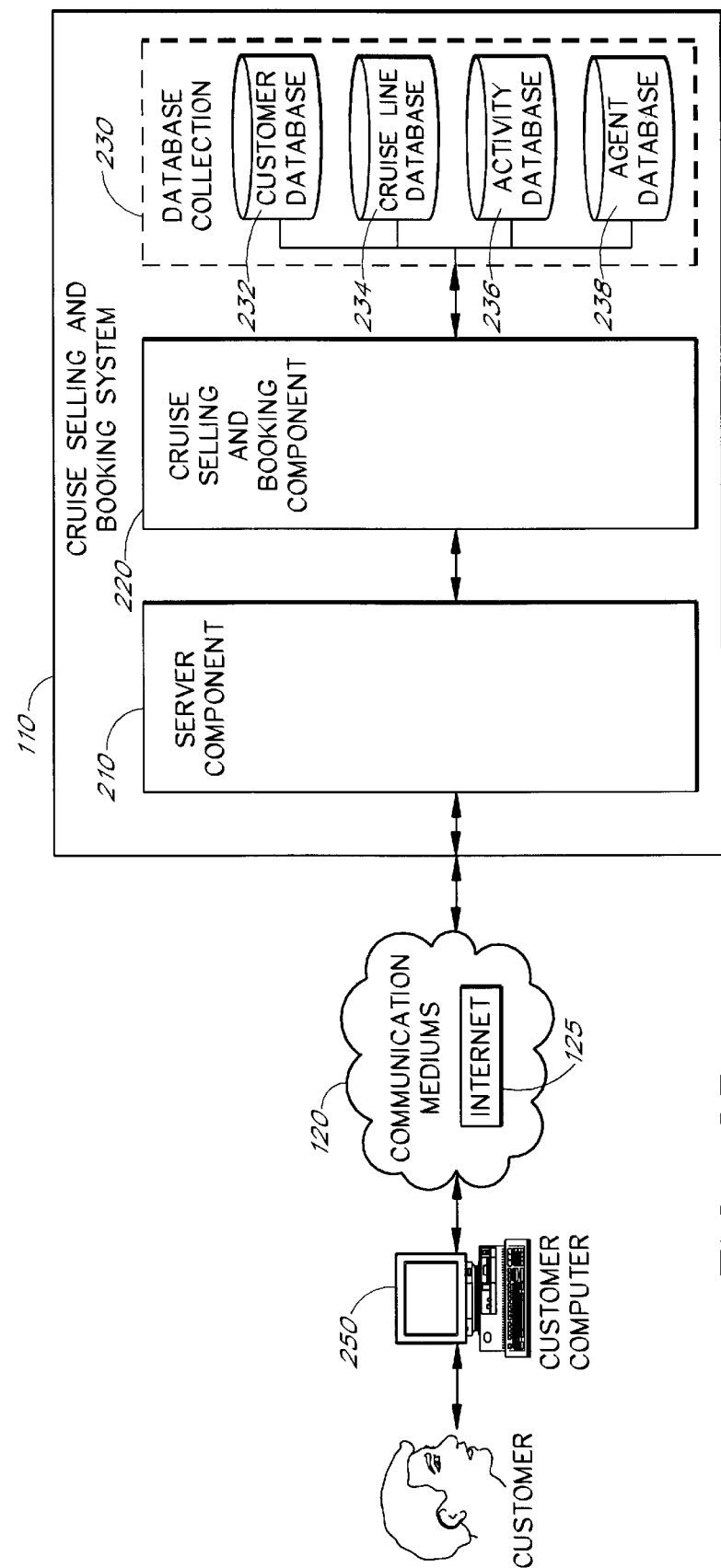
FIG. 2B illustrates a high-level block diagram of an additional embodiment of the present invention.

In one embodiment, a customer may also access the cruise selling and booking system 110 without necessarily interacting with an agent as illustrated in FIG. 2B. For example, a customer may connect to the cruise selling and booking system 110 via a web based service by utilizing a standard web browser on his own computer to connect to the cruise selling and booking system 110 web page. In one embodiment, should the customer desire the assistance of an agent, the cruise selling and booking system 110 may store the information entered by the customer in the database collection 230. An agent with access to the cruise selling and booking system 110 may subsequently retrieve the information. This feature provides improved customer/agent interactivity by saving the customers from repeating information previously stored in the cruise selling and booking system 110 to each agent with whom they interact.

In one embodiment, a system and method of maintaining customer relationships may commence with a customer interacting with an agent who has the expertise and resources to efficiently assist the customer through the cruise booking process. Because of the amount of time and energy the agent must spend with the customer to book the cruise, the customer/agent relationship becomes an important aspect to ensuring that a high percentage of customers book cruises.

In one embodiment, the cruise selling and booking system 110 recognizes the customer/agent relationship through agent ownership. Agent ownership represents a pairing of customers with agents for a period of time giving an agent preferred access to a customer and his information. The cruise selling and booking system 110 may manage and track agent ownership by using rules of ownership to define the methods and permissible interactions in which the agent may maintain ownership of a customer, the duration or period of time that an agent has exclusive rights to a customer, and the potential booking commission derived from that customer. In addition, the cruise selling and bookings system may use the agent of record to track the agent to which a customer has been assigned. The cruise selling and booking system 110 may also use tools to release the customer from an agent ownership relationship when the ownership has expired allowing other agents to access the customer and form new ownership relations.

The agent of record relationship improves the efficiency with which a customer is serviced by directing the customer to the agent with whom he has had previous experience. Furthermore, the cruise selling and booking system 110 may use the agent of record relationship to determine commissions for each booked cruise allowing agents to be properly compensated for the time they spend with a customer in booking a cruise.

II. Cruise Selling and Booking System

An overview of one embodiment of a cruise selling and booking system 110 is shown in FIG. 2A. In the exemplary system, a customer communicates with an agent via telephone and the agent uses a computer (hereinafter "agent computer 240") to connect to the Internet 125 to communicate with the cruise selling and booking system 110. While the figure illustrates communication between the agent and customer via telephone, it is recognized that the communication between the customer and the agent may take any of a number of forms including in-person conversations, mailed correspondence e-mail, facsimiles, and so forth. Additionally, the customer may use a computer (hereinafter "customer computer 250") to interact with the agent through online methods which may include email correspondence, live "chat" methods, dedicated software programs designed to facilitate online communication, and the like. In one embodiment, the cruise selling and booking system 110 includes a server component 210, a cruise selling and booking component 220, and a database collection 230. In one embodiment, the database collection 230 includes a customer database 232, a cruise line database 234, and activity database 236, and an agent database 238. It is recognized that the information stored in the database collection 230 may be discretely stored in multiple independent databases, combined in a single database, or a combination thereof.

In one embodiment, the agents and/or customers interact with computers to access the cruise selling and booking system 110 via communication mediums 120.

A. Communication Mediums

The communication mediums 120 as shown in FIGS. 2A and 2B include the Internet 125. The Internet 125 is a global network of interconnected computers capable of sending and receiving information between one another. The structure of the Internet 125, which is well known to those of ordinary skill in the art, includes a network backbone comprising communications channels such as copper wire, optical fiber, or satellite based interconnections between numerous computers, hubs, and routers which control, direct, and maintain information passed between computers. Additional networks branch from the above-mentioned backbone, and these branches, in turn, have sub-networks branching from them, and so on. Typically, information is passed through the network in the form of packets which are discrete pieces the information desirably sent through the network. These packets of information are encoded in a form interpretable by the network infrastructure and may support features such as data compression, encryption, and error correction to optimize the speed and efficiency by which the information is transferred. For a more detailed description of the structure and operation of the Internet 125, please refer to "The Internet Complete Reference," by Harley Hahn and Rick Stout, published by McGraw-Hill, 1994.

One popular segment of the Internet 125 is the World Wide Web (or Web). The World Wide Web comprises many thousands of computers which utilize the Internet 125 infrastructure to serve and distribute information. Typically, a server system is capable of two-way communication with other computers and can desirably send information to other computers which request the information or content stored on the server system. The information stored on the server system is typically interpreted using a software package known as a browser, which is capable of displaying graphical, textual, audio and/or visual information.

Some of the server systems, which provide information on the World Wide Web, are often referred to as "websites" and interact with other computers on the World Wide Web. Generally, each website has an associated electronic page or series of electronic pages which the server sends to those computers requesting the information. The requested information generally takes the form of an electronic page (or web page) encoded in one or more specific languages that is interpreted by the requesting computer and the browser which it runs. Several such languages commonly used by web servers include, but are not limited to, Hypertext Markup Language ("HTML"), JAVA, JAVA Script, Extensible Markup Language ("XML"), Active Server Pages ("ASP"), and CGI scripting. The web page provides the requesting computer with a document that organizes the presentation of the information into a display using text, graphical images, audio, and/or video. Furthermore, the computer, on which the online document is viewed, may communicate with the website by sending and receiving information through interface objects such as, for example, fields, buttons, pull down menus, and key entered commands. For a more detailed description on the World Wide Web, please refer to "How to Set Up and Maintain a World Wide Web Site" by Lincoln D. Stein, published by Addison-Wesley Publishing Company, 1995.

One of ordinary skill in the art will recognize that the communication mediums 120 may be advantageously be comprised of one or more types of networks without detracting from the invention. The communication mediums 120 may include, by way of example, local area networks ("LANs"), wide area networks ("WANs"), public internets, private internets, a private computer network, a secure internet, a private network, a public network, a value-added network, interactive television networks, wireless data transmission networks, two-way cable networks, interactive kiosk networks, digital subscriber lines, cable modem lines, and the like. The disclosed invention is thus suitable for providing connectivity through many different forms of communication mediums 120, however, it will be further discussed in the context of connecting through the Internet 125. In addition, it is recognized that one or more networks may be used to access the cruise selling and booking system 110. For example, a customer may interact with the cruise selling and booking system 110 via the Internet 125, an agent may interact with the cruise selling and booking system 110 via a LAN, and/or the cruise lines may interact with the cruise selling and booking system 110 via a wireless data transmission network. In another embodiment, the customers, agents, and cruise lines may all access the cruise selling and booking system 110 via the Internet 125.

B. User Computer

The agent computer 240 and/or customer computer 250 ("user computers 240, 250") shown in FIGS. 2A and 2B are devices that allow the customer or agent to interact with cruise selling and booking system 110 via the communication mediums 120. In one embodiment, the user computer 240, 250 is a conventional personal computer equipped with a modem, Ethernet card, or other component which allows the computer to send and receive information through the communication mediums 120. Preferably, the user computer 240, 250 runs an appropriate operating system such as the Microsoft® Windows® 3.1, Microsoft® Windows® 98, Microsoft® Windows® 98 Second Edition®, Microsoft® Windows® Millennium Edition®, Microsoft® Windows® NT, Microsoft® Windows® 2000, Microsoft® Windows® CE, PalmOS®, Apple® MacOS®, Linux®, Solaris®, IRIX®, UNIX®, or IBM® OS/2® operating systems. As is conventional, a preferred operating system further includes a TCP/IP stack or other communications protocol which handles all incoming and outgoing message traffic passed over the communication mediums 120.

In other embodiments, the user computer 240, 250 may, for example, be a computer workstation, a local area network of individual computers, an interactive television, an interactive kiosk, a personal digital assistant, an interactive wireless communications device, cellular phone, or the like which interacts with the communication mediums 120. While in such systems, the operating systems may differ, the various operating systems may continue to provide the appropriate communication protocols needed to establish communication links with the communication mediums 120.

In one embodiment, the user computer 240, 250 utilizes several operational modules (not shown) including a customer or agent browser module. The browser module is a software program which allows a consumer to access different content providers through the communication mediums 120. In one embodiment, the browser module is the Netscape® Navigator developed by Netscape, Inc. or the Microsoft® Internet Explorer developed by Microsoft Corporation. One of ordinary skill in the art, however, will recognize that numerous other types of access software may also be used to implement an embodiment of the present invention. These other types of access software may, for example, include other types of Internet browsers, custom network browsers, two-way communications software, cable modem software, point-to-point software, and the like.

While the agent computer 240 and customer computer 250 are referred to as user computers 240, 250, it is recognized that the agent computer 240 and the customer computer 250 may be implemented using different or the same hardware and/or software.

C. Cruise Selling and Booking System

Figure 3A:
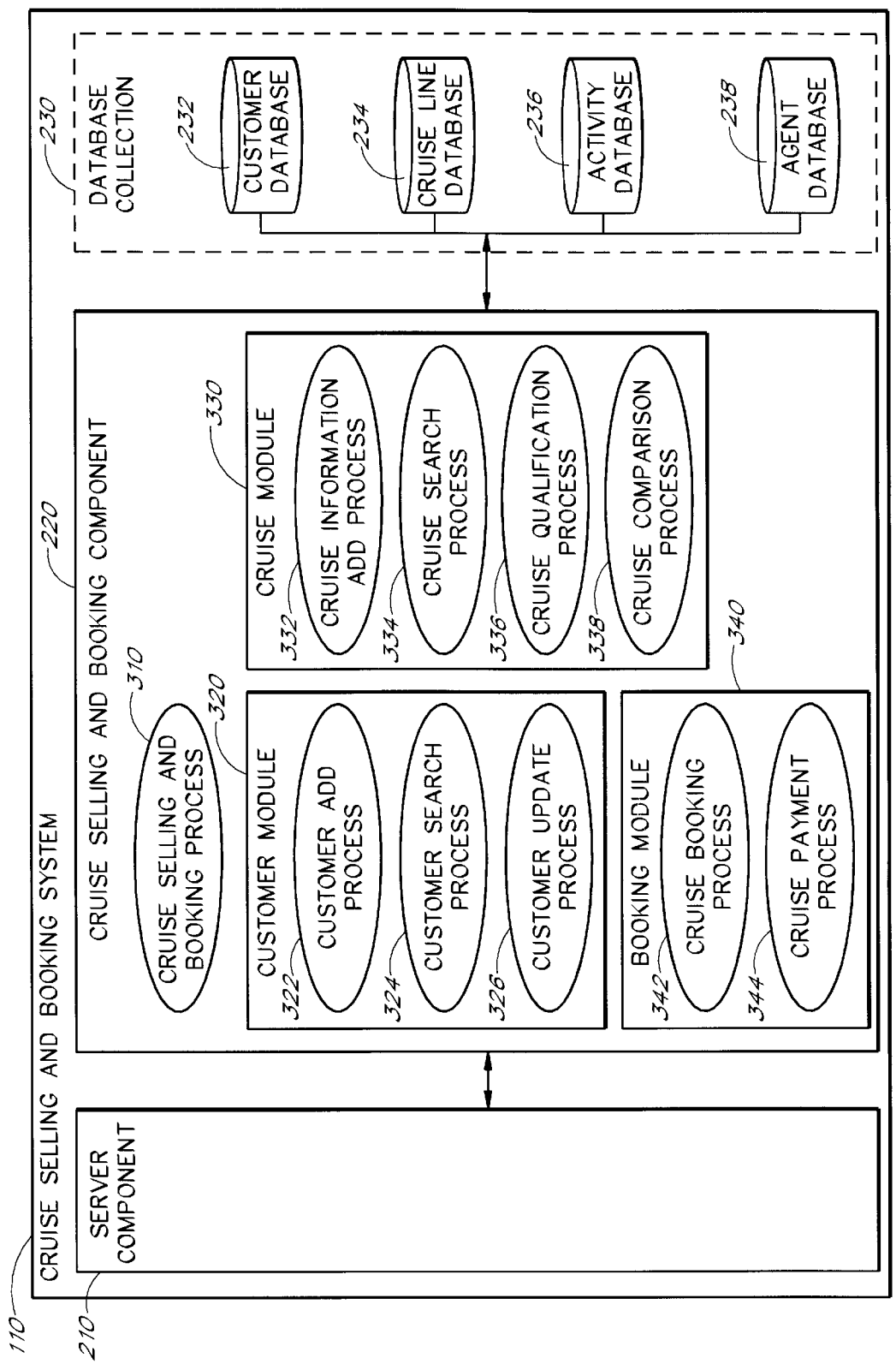
FIG. 3A illustrates a high-level block diagram of one embodiment of the present invention.

In one embodiment, the cruise selling and booking system 110 includes a server component 210, a cruise selling and booking component 220, and a database collection 230 as illustrated in FIG. 3A.

As used herein, the words component and module refer to logic embodied in hardware or firmware or to a collection of software instructions, possibly having entry and exit points, written in a programming language, such as, for example, C++, VISUAL BASIC, JAVA, C, FORTRAN, JAVA Script, and so forth. A software component/module may be compiled and linked into an executable program, or installed in a dynamic link library, or may be written in an interpretive language such as BASIC. It will be appreciated that software components/modules may be callable from other components or from themselves, and/or may be invoked in response to detected events or interrupts. Software instructions may be embedded in firmware, such as an EPROM. It will be further appreciated that hardware components/ modules may be comprised of connected logic units, such as gates and flip-flops, and/or may be comprised of programmable units, such as programmable gate arrays or processors. The components described herein are preferably implemented as software components/modules, but may be represented in hardware or firmware.

1. Server Component

In one embodiment, the cruise selling and booking system 110 includes a server component 210, as shown in FIG. 3A, that interacts with the cruise selling and booking component 220 and with the user computers 240, 250 via the communication mediums 120. The server component 210 may be configured to process messages from the user computer 240, 250, to send requests to the cruise selling and booking component 220, and to send response messages to the user computer 240, 250.

In one embodiment, the server component 210 is implemented as a web server which serves content over the Internet 125 using languages such as, the Hyper Text Markup Language ("HTML"). The web server may accept requests from browsers, such as, for example, the Netscape® Navigator or the Microsoft® Internet Explorer, and return the requested document(s) to the browsers. The web server may also utilize scripting programs, such as, for example, CGI scripts, SSL security, and Active Server Pages ("ASP") to provide additional functionality. A wide variety of web servers may be used to implement the server component 210, such as, for example, AOLserver, the Apache server, the iServer, Microsoft IIS v5.0 server, Microsoft Site server, Netscape Enterprise server, WebSite Pro server, Xitami server, and so forth. Furthermore, the server component 210 may also be implemented using a variety of other servers, such as, for example, the BlueStone Sapphire server, the Interop server, a Netscape Server, an Oracle server, a SilverStream server, the Sybase Enterprise Server, the WebObjects server, and so forth. In addition, the server component 210 may be implemented using a variety of computer systems, such as, for example, a conventional general purpose computer using one or more microprocessors, such as, for example, a Pentium processor, a Pentium II processor, a Pentium Pro processor, an xx86 processor, an 8051 processor, a MIPS processor, a Power PC processor, or an Alpha processor, running a variety of platforms, such as, for example, Mac OS, OpenLinux, Red Hat Linux, Sun Solaris, SGI IRIX, Novel NetWare, Windows NT Server 4.0, and/or Windows 2000 Server.

2. Cruise Selling and Booking Component

In one embodiment, the cruise selling and booking system 110 includes a cruise selling and booking component 220, as shown in FIG. 3A, that interacts with the server component 210 and the database collection 230. In other embodiments, it is recognized that the cruise selling and booking component 220 may also interact with external sources, such as, for example, proprietary cruise line systems, banking/financial systems, other travel agencies, external databases, and so forth. In one embodiment, the cruise selling and booking component 220 processes search requests from the server component 210, queries the database collection 230 and/or external sources for requested information, receives the query results from the various sources, processes the results, compiles the results into a set of data, and formats the results for presentation to the user via the server component 210.

The exemplary cruise selling and booking component 220 of FIG. 3A includes a cruise selling and booking process 310, a customer module 320, a cruise module 330, and a booking module 340. The cruise selling and booking process 310 guides the user through searching for cruise packages and booking a selected package. The exemplary customer module 320 includes a customer add process 322 that adds new customers to the customer database 232, a customer search process 324 that queries the customer database 232, and a customer update process 326 that updates an existing customer's information. The exemplary cruise module 330 includes a cruise information add process 332 that adds information about the cruise lines, the cruise ships, the cruise sailings, and/or the cruise packages to the cruise database, a cruise search process 334 that queries the cruise database, a cruise qualification process 336 that receives a set of cruise preferences and finds cruise sailing and/or cruise price information that matches the set of cruise preferences, and a cruise comparison process 338 that receives identifiers for multiple cruise sailings or packages and returns detailed information about the identified objects in a comparison format. The exemplary booking module 340 includes a cruise booking process 342 that receives cruise reservation/booking information and books the corresponding cruise package, and a cruise payment process 344 that receives cruise payment information and forwards the payment information to the appropriate entity.

Figure 3B:
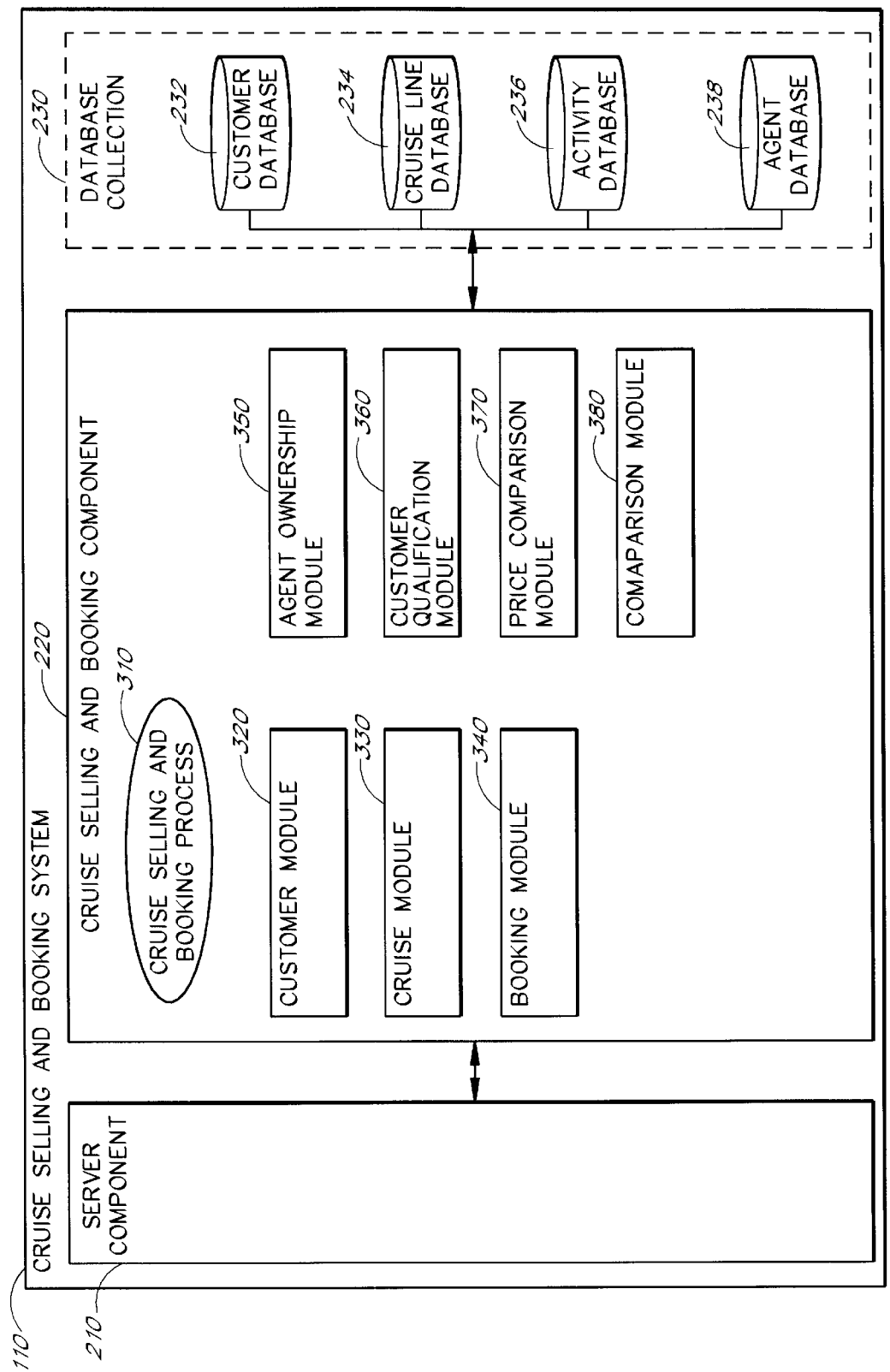
FIG. 3B illustrates a high-level block diagram of an additional embodiment of the present invention.

An additional embodiment of a cruise selling and booking component 220 is illustrated in FIG. 3B. In addition to the customer module 320, the cruise module 330, and the booking module 340, the cruise selling and booking component 220 also includes an agent ownership module 350 configured to track and manage agent of record relationships, a customer qualification module 360 configured to match a customer's preferences with a variety of cruise package options, a price comparison module 370 configured to present the user with pricing options and to provide price matrices of detailed pricing information, and a comparison module 380 configured to provide side-by-side comparisons of various cruise package and pricing information.

It is recognized that in other embodiments, the cruise selling and booking component 220 may include other processes (not shown) that provide information from the database collection 230 as well as other external sources.

The cruise selling and booking component 220 may be implemented using a variety of software and hardware components. For example, the cruise selling and booking component 220 may include a set of electronic page documents that are written in HTML code, ASP scripts, and so forth. As is well known in the art, standard HTML documents are web documents wherein the structure and layout are defined by a variety of tags and attributes and are capable of being read by standard browsers. Active Server Pages ("ASP") is a server-based, script language developed by Microsoft Corporation that allows for the dynamic generation of HTML code via server and client program scripts. Rather than maintain separate script programs and electronic page documents, the script programs may be embedded in the active server pages to form a set of "smart" electronic page documents. As is well known in the art, ASP documents do not need to be compiled, they can run on any browser, and may allow the transfer of information from the database collection 230. For a more detailed description of Active Server Pages, please refer to "ASP in a Nutshell: A Desktop Quick Reference," by A. Keyton Weissinger, published by O'Reilly & Associates, Inc., 1999.

In addition, the cruise selling and booking component 220 may include additional software modules programmed in variety of languages for processing user requests, performing data lookup, compiling sets of data, formatting data, and so forth.

In one embodiment, the cruise selling and booking component 220 is implemented on the same component as the server component 210, though it is recognized that in other embodiments, the cruise selling and booking component 220 may be implemented in a separate component. For more information on the types of computers and/or platforms that may be used to implement the cruise selling and booking component 220, please see the section above entitled "Server Component."

3. Database Collection

In one embodiment, the cruise selling and booking system 110 includes a database collection 230, as shown in FIGS. 3A and 3B, that stores data about the customers, the cruises lines, the activities, and the agents. The exemplary database collection 230 includes four databases, a customer database 232, a cruise line database 234, an activity database 236, and an agent database 238.

The customer database 232 includes information about the customers. Such information may include name, address, phone number, cruise history, cabin preference, family information, age, travel destination preference, as well as other travel-related information.

The cruise line database 234 may include information about various cruise lines, various cruise ships, and various cruise sailings. The information about specific sailings may further include information such as ship name, number, sailing destination, departure dates, number of cabins, cabin categories, dining room capacity, viewable maps of the ship, as well as other detailed cruise line information. In addition, the cruise line database 234 may include information such as cabin availability and pricing data. In one embodiment, the cruise line database 234 data may be entered manually by a travel agent or downloaded/received from the cruise lines and/or other sources.

In one embodiment, the cruise line database 234 enables information about the various cruise lines to be stored in a single database or database collection. The cruise lines have a myriad of data that is organized differently according to each cruise line. For example, the cruise lines tend to use their own proprietary naming and pricing schemes; they individually select how the data is selected, stored, and configured; and some cruise lines may provide data that other cruise lines do not. For example, many cruise lines use their own system for categorizing cabins and have also use their own pricing schemes.

In some embodiments, the cruise line database 234 may normalize all of the data from the various cruise lines into a uniform system. In other embodiments, the cruise line database 234 may be configured to accommodate a wide variety of data. For example, the cruise line database 234 may include a table of categories in which each cruise line may have its own unique set of categories ranked from most luxurious to most economical thus maintaining the individuality of each cruise line while at the same time enabling the various cruise line data to be compared. The cruise line database 234 may, for example, provide pricing information for the most luxurious cabins for cruise sailings on Cruise Line A and Cruise Line B even though the cruise lines use different cabin naming nomenclature and different category structures.

The activity database 236 includes information about the activities in the cruise selling and booking system 110. These activities may include brochures, leads, quotes, reservations, bookings, as well as other ongoing activity information. In one embodiment, the activity database 236 is closely linked with the customer database 232, the cruise line database 234, and the agent database 238.

The agent database 238 includes information about the agents that use the cruise selling and booking system 110. Agent information may include the agents' logins, passwords, access privileges, company, address, phone numbers, booking history, current commission, and so forth.

While the database collection 230 depicted in FIGS. 3A and 3B includes four separate databases, it is recognized that in other embodiments, the database collection 230 may include other databases and/or some of the exemplary databases may be combined.

In one embodiment, the database collection 230 may be implemented with Structured Query Language ("SQL") code. The structured query language is a language standardized by the International Standards Organization ("ISO") for defining, updating, and querying a relational database. It is recognized however, that other code may be used to access the database collection 230. For example, in one embodiment, the database collection 230 may interact with various accessory programs to store, retrieve, and process the information of the databases, such as, for example, dynamic link libraries ("DLLs"). DLLs (not shown) may interact with the server component 210, the cruise selling and booking component 220, and the database collection 230 directly, or with the database collection 230 via a database manipulation module, such as, for example, a Microsoft Database Access Object ("DAO"). The execution of the DLL may be called automatically from within the scripts or routines of the web page documents as needed and may not necessarily require the customer or agent explicitly launch a separate program or series of programs.

In one embodiment, the database collection 230 is implemented using a relational database, such as, for example, those sold by Oracle Corp. or Sybase. It is recognized however that other relational databases may be used and/or other types of databases may be used, such as, for example, object oriented databases, flat file databases, and so forth. Furthermore, the database collection 230 may be implemented as a single database with separate tables or as other data structures that are well know in the art such as linked lists, binary trees, and so forth.

In one embodiment, the database collection 230 is implemented as a separate component or separate components from the cruise selling and booking component 220 and/or the server component 210, though it is recognized that in other embodiments, the database collection 230 may be implemented on the same component as the cruise selling and booking component 220 and/or the server component 210. For more information on the types of computers and/or platforms that may be used to run the database collection 230, please see the section above entitled "Server Component." As noted above, one embodiment that is implemented using a web server ("web server environment") provides several advantages. First, the web server environment does not require any dedicated hardware or software to be installed on the customer or agents computer which will utilize the cruise selling and booking system 110. This advantage may apply to both customers and agents in that they do not have the burden of expense normally associated with purchasing or licensing a dedicated system. Second, maintenance and upgrades of the cruise selling and booking system 110 may be centrally administrated and automatically processed with little or no intervention by those using the cruise selling and booking system 110. For example, the cruise line database 234 may be updated without the customer's knowledge. In addition, each computer which connects to the cruise selling and booking system 110 automatically receives and connects with the most appropriate software as determined by the web server of the cruise selling and booking system 110. In addition, the interactive interface of the cruise selling and booking system 110, like many interactive web pages, uses the familiar environment of a web browser running on the computer the customer or agent uses, thus, minimizing the learning time required to operate and become proficient with the cruise selling and booking system 110.

A detailed description of embodiments of a cruise selling and booking system 110 is disclosed in a concurrently filed application having the title "SYSTEMS AND METHODS OF ON-LINE BOOKING OF CRUISES," internal reference number TRAVL.002A, which is incorporated herein by reference. A detailed description of embodiments of a compare display is disclosed in a concurrently filed application having the title "SYSTEMS AND METHODS OF COMPARING PRODUCT INFORMATION," internal reference number TRAVL.017A, which is incorporated herein by reference. A detailed description of embodiments of pricing options and price matrices is disclosed in a concurrently filed application having the title "SYSTEMS AND METHODS OF DISPLAYING CRUISE LINE PRICING DATA," internal reference number TRAVL.018A, which is incorporated herein by reference. A detailed description of embodiments of qualification is disclosed in a concurrently filed application having the title "SYSTEMS AND METHODS OF MATCHING CUSTOMER PREFERENCES WITH AVAILABLE OPTIONS," internal reference number TRAVL.020A, which is incorporated herein by reference.

III. Agent Ownership Module

Figure 4:
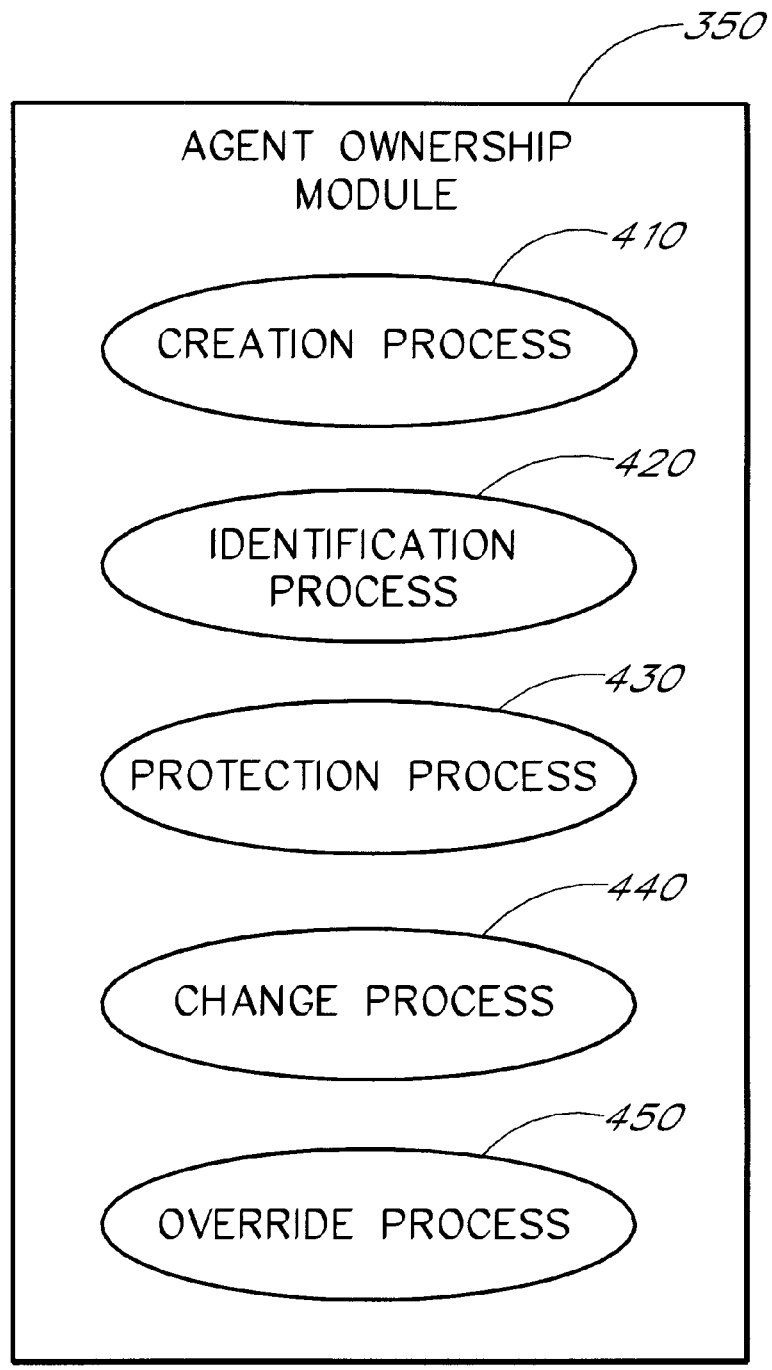
FIG. 4 illustrates a high-level block diagram of one embodiment of an agent ownership module.

In one embodiment, the cruise selling and booking component 220 includes an agent ownership module 350 used to track and manage the agent of record relationships. FIG. 4 illustrates one embodiment of an agent ownership module 350 which includes several processes such as an agent of record creation process 410, an agent of record identification process 420, an agent of record protection process 430, an agent of record change process 440, and an agent of record override process 450. For more information on the agent of record processes, please refer to the section below entitled "Agent Ownership Processes." The agent ownership module 350 may also include other processes (not shown).

In one embodiment, the agent ownership module 350 may be implemented using one or more of a variety of technologies such as, C++, VISUAL BASIC, JAVA, JAVA Script, Active Server Pages ("ASP"), Extensible Markup Language ("XML"), as well as other scripting languages that may be used to dynamically retrieve, generate, process, and/or format the data for a web document.

As used herein, the word module, whether in upper or lower case letters, refers to logic embodied in hardware or firmware, or to a collection of software instructions, possibly having entry and exit points, written in a programming language, such as, for example, C++. A software module may be compiled and linked into an executable program, or installed in a dynamic link library, or may be written in an interpretive language such as BASIC. It will be appreciated that software modules may be callable from other modules or from themselves, and/or may be invoked in response to detected events or interrupts. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware.

IV. Agent Ownership Processes

In one embodiment, the agent ownership module 350 includes several processes such as an agent of record creation process 410, an agent of record identification process 420, agent of record protection process 430, an agent of record change process 440, and an agent of record override process 450.

A. Creating an Agent of Record

Figure 5:
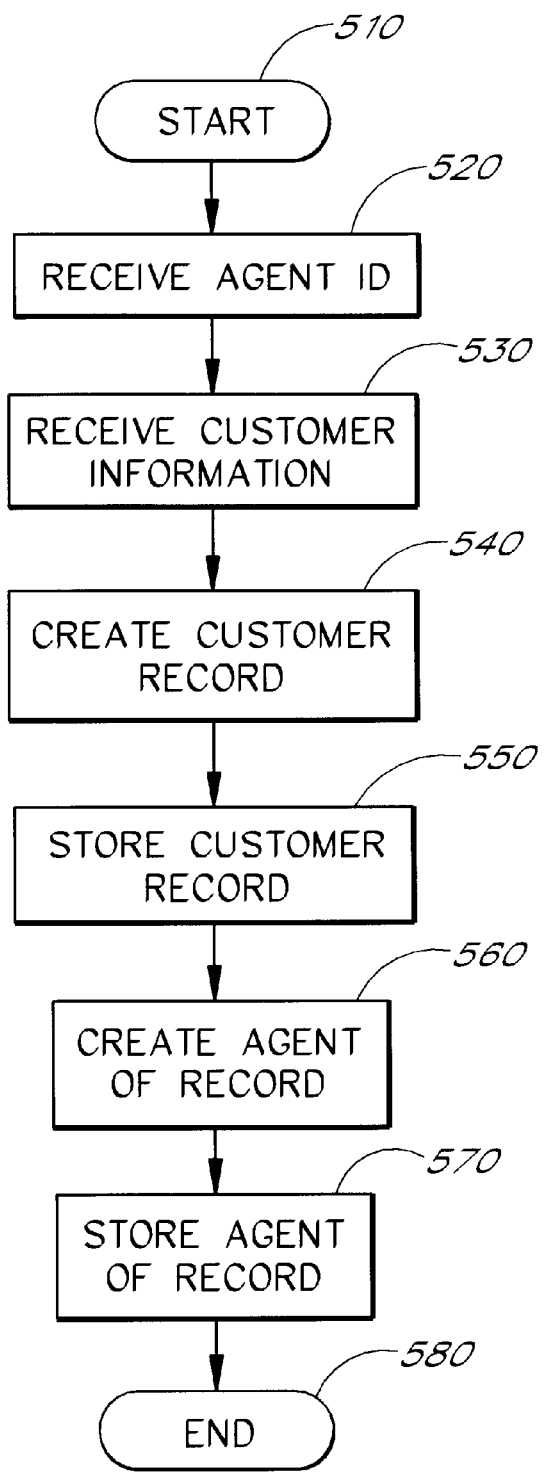
FIG. 5 illustrates a flow chart of one embodiment of creating an agent of record relationship.

FIG. 5 illustrates one embodiment of an agent of record creation process 410 that creates an association between an agent and a new customer, such as, for example, when a new customer contacts a travel agency for the purposes of booking a cruise. Beginning at a start state (block 510), the agent of record creation process 410 proceeds to the next state and receives and agent's ID (block 520). To send an identifier, the agent may sign on to the cruise selling and booking system 110 using a login or he may submit his ID if he is already signed on. Typically, the first interaction between the new customer and agent involves the agent collecting personal information about the customer. The personal information may include name, address, contact information, desired cruise destination, cruise dates, and the like. The information collected by the agent during the interaction with the customer is sent to the cruise selling and booking system 110. The agent of record creation process 410 receives the collected information (block 530). This information includes a unique customer ID which may be automatically generated by the system, manually entered by the agent, based on the customer's personal information (e.g., full name, social security number), a combination of the above, and so forth. The agent of record creation process 410 may then create a customer record using the personal information (block 540) and store the information in the customer database 232 (block 550) which may be subsequently retrieved and edited by the agent, the agent's manager, and so forth. The agent of record creation process 410 may also create an agent of record relationship (block 560) in which the agent collecting the information about the customer is designated as the agent of record for the customer for a certain amount of time. The agent of record creation process 410 may then store the association in the customer database 232 (block 570) and proceed to an end state (block 580).

It is recognized that the agent of record creation process 410 may be implemented differently in other embodiments. For example, the agent of record creation process 410 may wait to store the customer information until the agent of record has been created and/or the agent of record creation process 410 may store the association in the agent database 238 or another database.

B. Identifying an Agent of Record

After an agent of record association has been created, in one embodiment, the agent ownership module 350 may automatically determine the agent to whom a customer may be directed when he contacts the travel agency during subsequent interactions.

Figure 6:
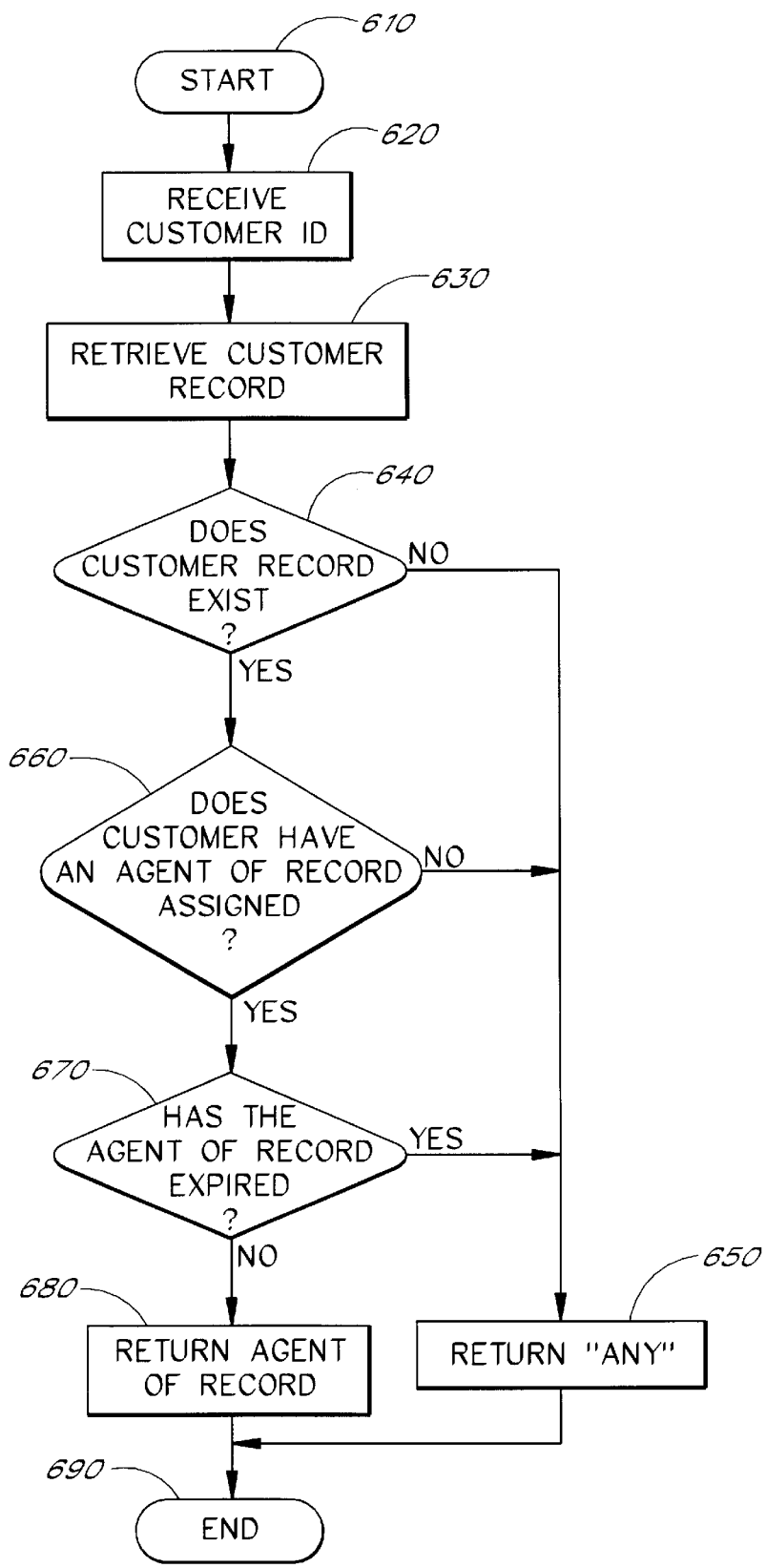
FIG. 6 illustrates a flow chart of one embodiment of identifying an agent of record.

FIG. 6 illustrates one embodiment of an agent of record identification process 420 that returns the agent of record, if any, for a customer. Beginning at a start state (block 610), the agent of record identification process 420 ("identification process") proceeds to the next state and receives a customer ID (block 620). Proceeding to the next state, the identification process 420 searches the customer database 232 for the customer ID and retrieves the corresponding customer record (block 630). Next, the identification process 420 determines whether the customer record exists (block 640). If the customer record does not exist, the identification process 420 proceeds to block 650. If the customer record does exist, the identification process 420 determines whether an agent of record has been assigned (block 660). If an agent of record has not been assigned, the identification process 420 proceeds to block 650. If an agent of record has been assigned, the identification process 420 determines whether the agent of record has expired (block 670). If the agent of record has expired, the identification process 420 proceeds to block 650. At block 650, the identification process 420 returns a designator signifying that any available agent may work with the customer and proceeds to an end state (block 680). If the agent of record has not expired, the identification process 420 returns a designator indicating the agent of record (block 680) and proceeds to an end state (block 690).

It is recognized that the agent of record identification process 420 may be implemented differently in other embodiments. For example, the agent of record identification process 420 may return "NULL" or a set of different messages if the customer record does not exist, the agent of record has not been assigned, and/or the agent of record has expired.

C. Protecting an Agent of Record

In one embodiment, when a customer is assigned an agent of record, the agent is protected from competing agents which might otherwise attempt to book a cruise for the customer and acquire the booking commission without the original agent's permission or knowledge. The agent ownership module 350 may protect the agent of record by preventing access to customer records by a non-agent of record for a period of time as designated by the rules of agent ownership.

Figure 7:
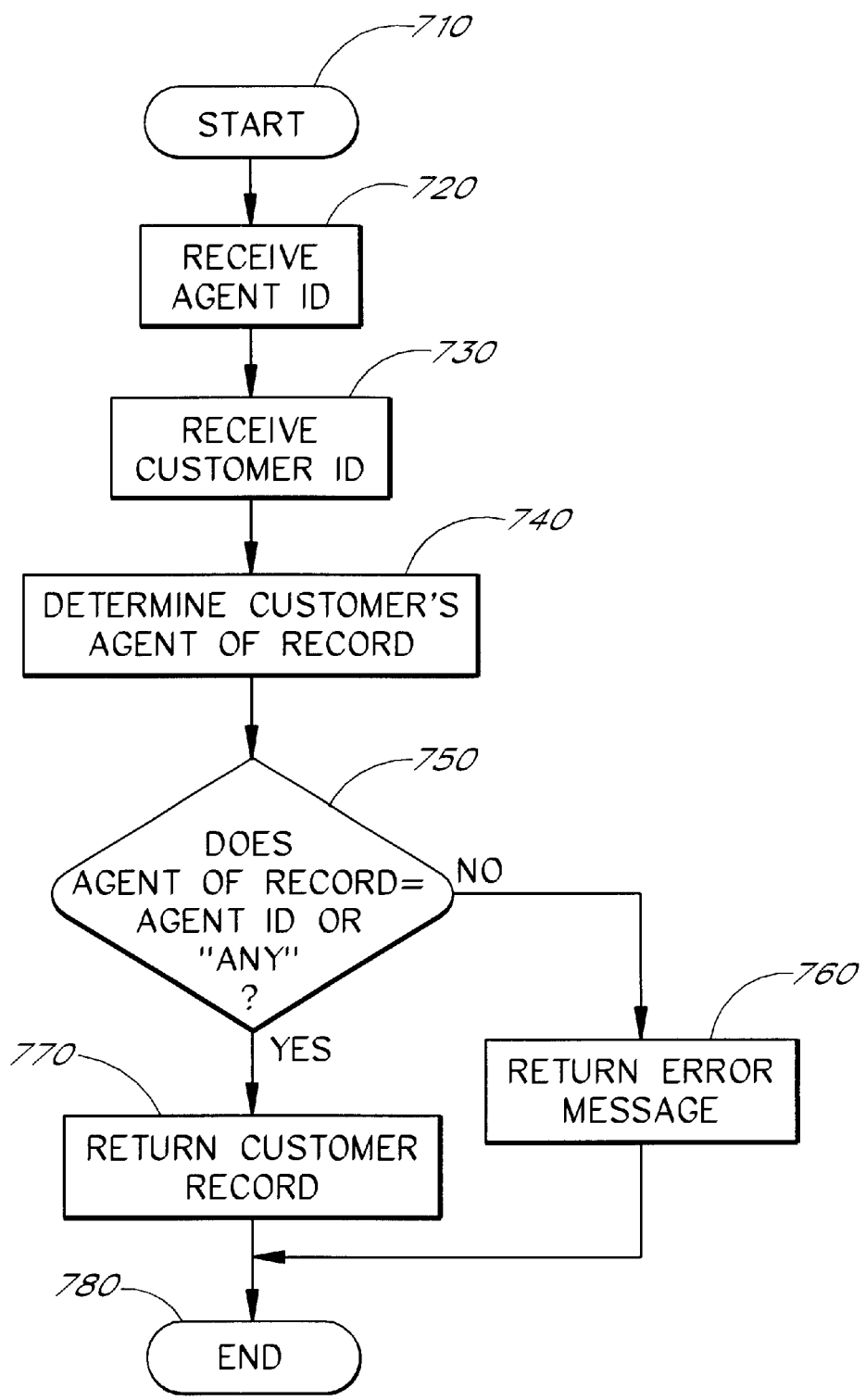
FIG. 7 illustrates a flow chart of one embodiment of verifying an agent of record.

FIG. 7 illustrates one embodiment of an agent of record protection process 430 ("protection process 430"). Beginning at a start state (block 710), the protection process 430 proceeds to the next state and receives the agent ID (block 720). Proceeding to the next state, the protection process 430 receives a customer ID (block 730). Proceeding to the next state, the protection process 430 determines the customer's agent of record (block 740). One embodiment of determining the customer's agent of record process is illustrated in FIG. 6 and described above, though it is recognized that other embodiments may be used. The protection process 430 then determines whether the agent ID matches the agent of record or if the customer is available (block 750). If not, the protection process 430 denies the agent access to the customer's information and may return a message, such as, for example, "You are not authorized to access this record" (block 760) and proceeds to an end state (block 780). If the agent ID matches or the customer is available, the protection process 430 returns the customer's record (block 770) and proceeds to the end state (block 780).

It is recognized that other embodiments of a protection process 430 may be used. For example, the protection process 430 may protect the agent of record by allowing a non-owning agent access to the customer record and may in one embodiment assign commission to the agent of record, and so forth.

D. Changing the Agent of Record

In one embodiment, the agent ownership module 350 may include a change agent of record process which allows the agent of record to be changed. For example, the agent may be reassigned and/or the expiration date may be altered.

Figure 8:
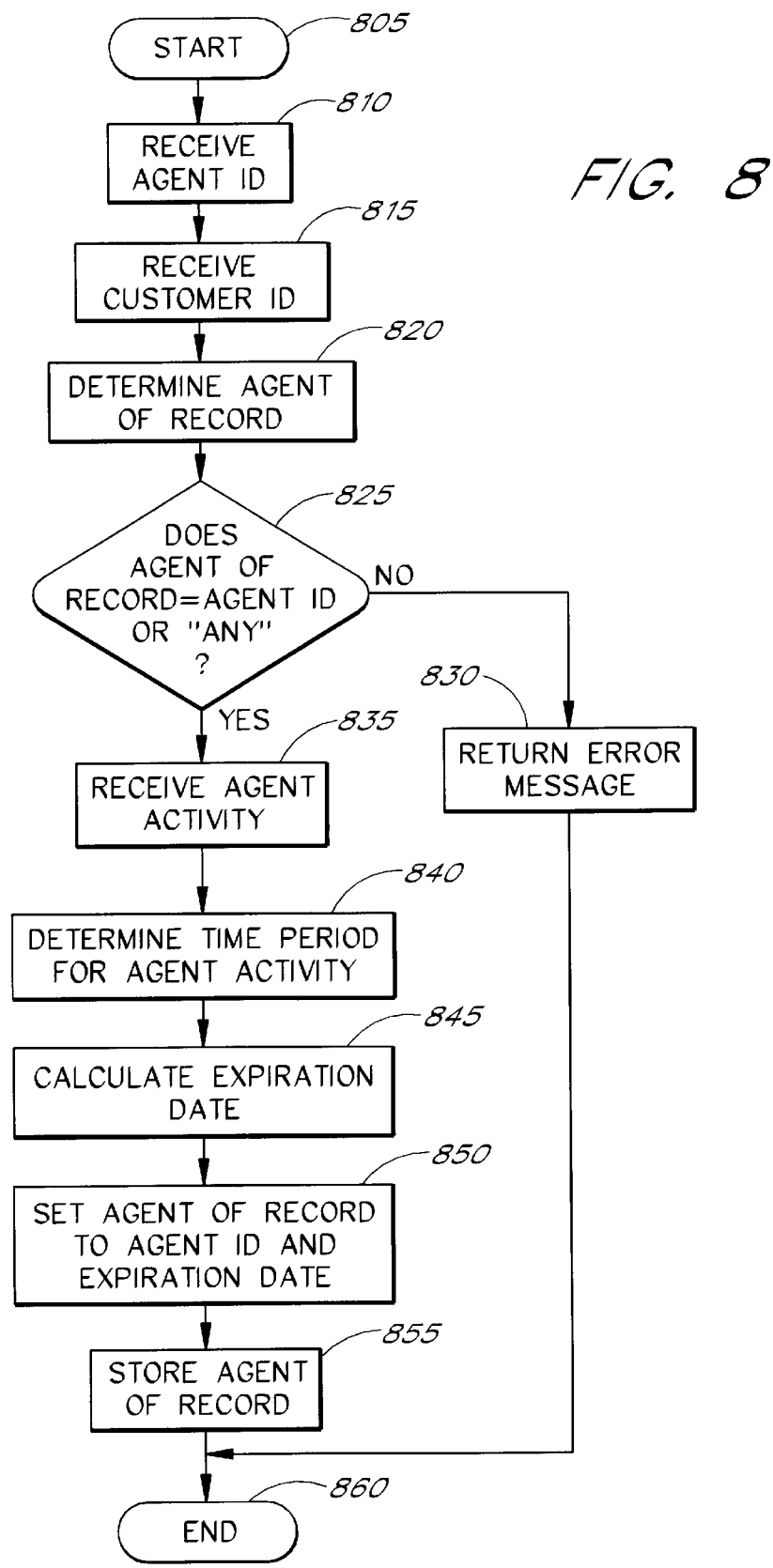
FIG. 8 illustrates a flow chart of one embodiment of changing an agent of record.

FIG. 8 illustrates one embodiment of an agent of record change process 440 ("change process 440"). Beginning at a start state (block 805) the change process 440 proceeds to the next state and receives the agent ID (block 810). Next, the change process 440 receives the customer ID (block 815) and determines the agent of record (block 820). One embodiment of determining the agent of record is illustrated in FIG. 6 and described above, however, it is recognized that other embodiments may be used. Proceeding to the next state, the change process 440 determines whether the agent of record matches the agent ID or is set to any available agent (block 825). If not, the change process 440 returns an error message (block 830), such as, for example, "You are not authorized to access this record" and proceeds to an end state (block 860). If the agent of record does correspond to the agent ID or the customer is available, the change process 440 receives an agent activity (block 835). Next, the change process 440 determines the time period associated with the agent activity (block 840). The change process 440 may determine the time period, such as, for example, by looking up the activity in a table of rules and retrieving the time period that corresponds to the activity. Using the time period, the change process 440 may then calculate the expiration date (block 845). For example, if the time period is ten days, then the change process 440 may take the current date and add ten days to the current date, and may use the calculated as the expiration date. Next, the change process 440 sets the expiration date to the calculated date and the agent of the record to the agent (block 850). It is recognized that in other embodiments, if the agent of record already matches the agent ID, the agent ID does not need to be reset. Proceeding to the next state, the change process 440 stores the agent of record (block 855). In one embodiment, the agent of record may be stored in the customer database 232, in the agent database 238, and/or in other databases. In addition, the agent record may be stored as a field in the customer of record. After storing the agent of record, the change process 440 proceeds to an end state (block 860).

E. Overriding the Agent of Record

In one embodiment, the agent ownership module 350 may include an override feature which permits the agent of record assignment to be reassigned by a user with the proper authorization such as that of a manager. Should the non-owning agent desire to acquire ownership of a customer, the agent ownership module 350 may permit a manager to authorize a reassignment of ownership by changing the agent of record for a temporary period of time or permanently.

In one situation, the reassignment in ownership may be temporary in nature and used to assign a sales commission to an agent who was not the initial agent of record but spent enough time and energy with a customer to merit receiving the commission for the booking. Such situations may arise, for example, when the original agent of record is not present for a prolonged period of time, on vacation, and/or unavailable to service the customer. In this embodiment, temporary ownership reassignment acknowledges the efforts made by the non-owning agent in booking the cruise for the customer. The agent of record subsequently reverts to the original agent of record after the temporary period of time preserving the customer pool of the original agent of record.

In another situation, the reassignment in ownership may be permanent in nature and used to designate a new permanent agent of record. In such a situation, agent ownership does not revert to the original agent of record, and a new permanent agent of record may be designated for a previously booked customer such that the original agent of record will no longer work with the customer. Such management features may be available to accommodate changes in responsibilities and employment status of existing agents and to ensure that customers are adequately serviced by the travel agency.

Figure 9:
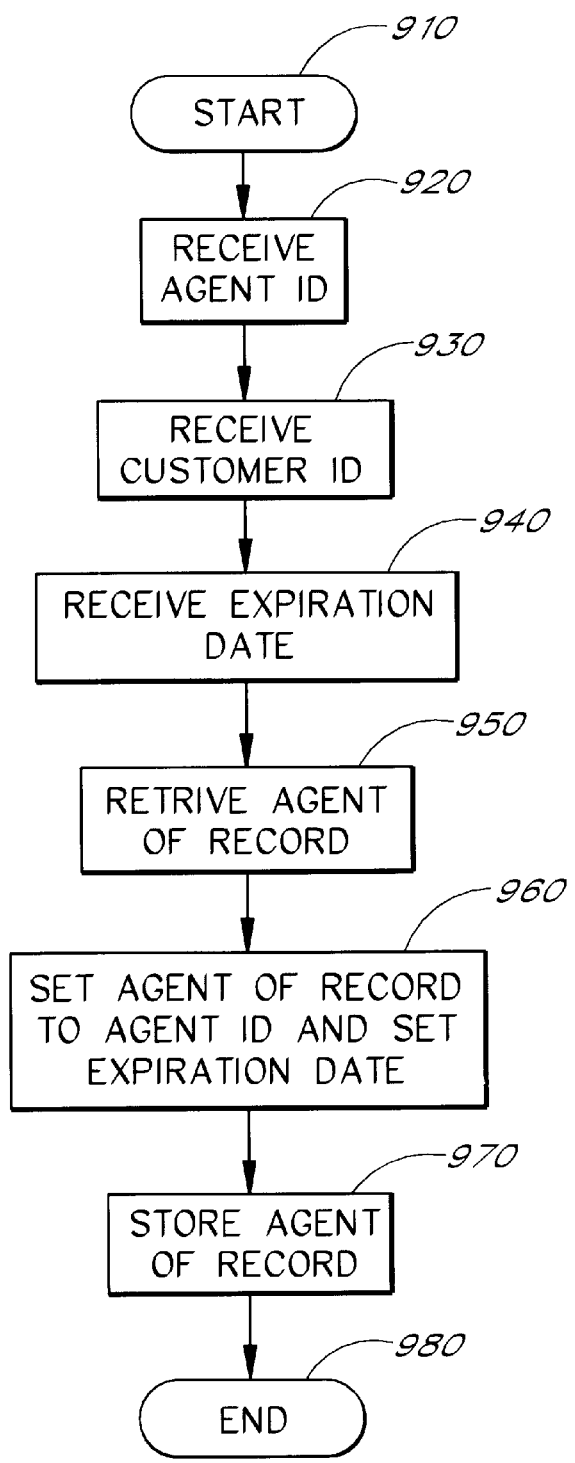
FIG. 9 illustrates a flow chart of one embodiment of overriding an agent of record.

FIG. 9 illustrates one embodiment of an agent of record override process 450 ("override process 450"). Beginning at a start state (block 910), the override process 450 proceeds to the next state and receives an agent ID (block 920) and receives a customer ID (block 930). Proceeding to the next state, the override process 450 receives an expiration date (block 940). Next, the override process 450 retrieves the agent of record (block 950). In one embodiment, the agent of record may be retrieved from the agent database 238, the customer database 232, and/or another database. It is recognized that in other embodiments, the agent of record may be stored in the customer record, such as, for example, as a field in the customer record, and so forth. Proceeding to the next state, the override process 450 sets the agent of record to the agent ID and sets the expiration date to the received expiration date (block 960). Next, the override process 450 stores the agent of record (block 970). As mentioned above, the agent of record may be stored in the agent database 238, the customer database 232, and/or another database. After the agent of record has been stored, the override process 450 proceeds to an end state (block 980).

It is recognized that the agent of record override process 450 may be implemented differently in other embodiments. For example, the agent of record override process 450 may only set the agent ID and/or the expiration date.

V. Activities

As previously discussed, a number of activities may be performed by the agents to affect the duration of agent ownership. The number, duration, and type of activities incorporated in the cruise selling and booking system 110 provide a structured set of resources through which the agent can help the customer research potential cruise options and make a decision as to which cruise package to book. Each of the activities performed by the agent may increase the amount of time the agent maintains ownership of the customer, and each of the activities is tracked by the cruise selling and booking system 110. In one embodiment, the duration of agent ownership designated for each activity is based, in part, on the time required for the agent to perform the activity as well as the perceived importance of the activity in ultimately ensuring the customer books a cruise. Thus, those activities which are determined to more likely result in customer cruise bookings may be associated with longer customer ownership durations.

Figure 10:
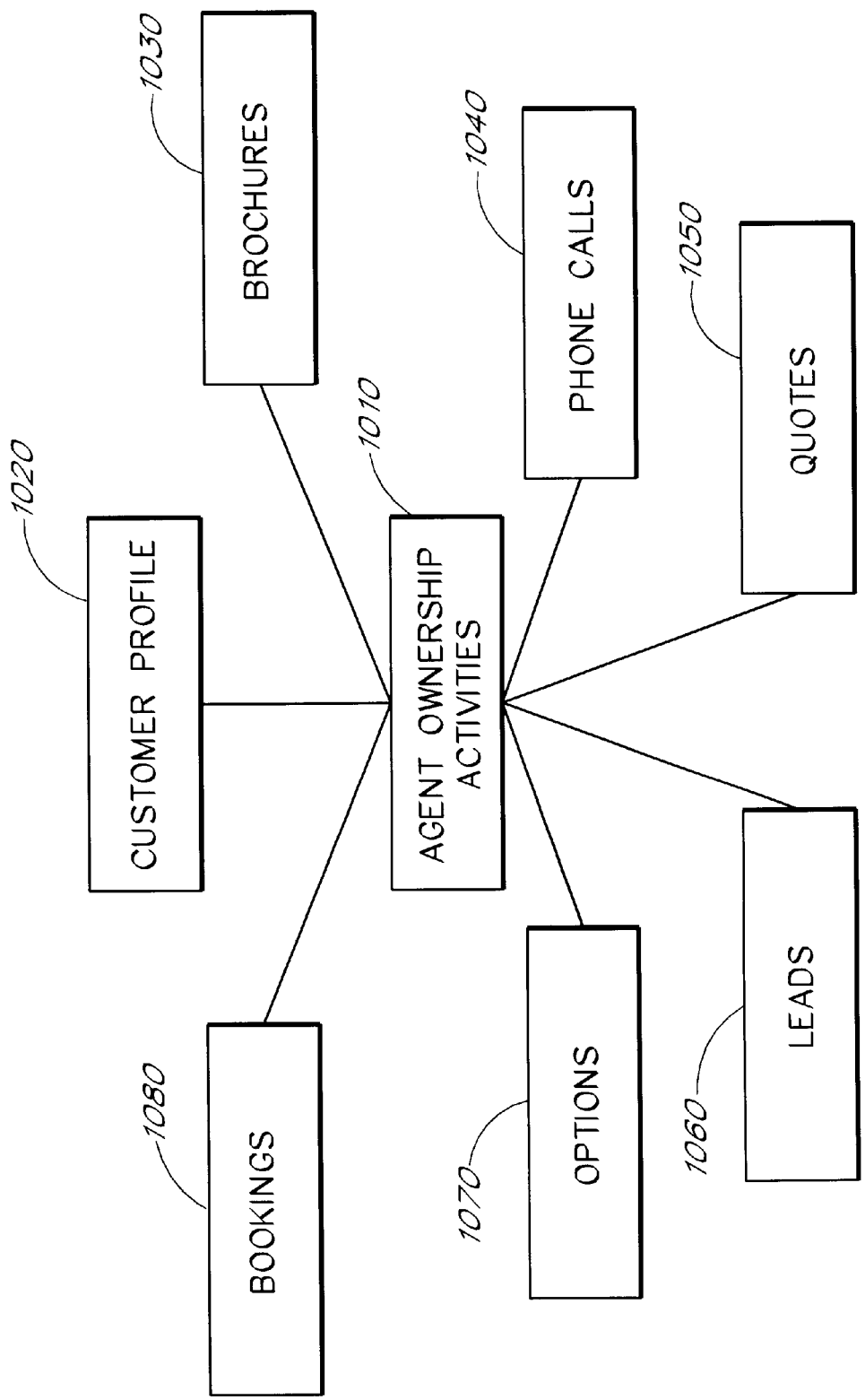
FIG. 10 illustrates a high-level block diagram of one embodiment of agent of record activities.

FIG. 10 illustrates example agent ownership activities 1010 that may be used by the cruise selling and booking system 110. A duration of agent ownership may be assigned to each activity and applied to agents as they interact with potential customers. The exemplary activities include customer profiles 1020, brochures 1030, calls 1040, quotes 1050, leads 1060, options 1070, and bookings 1080.

The customer profile activity 1020 is performed by the agent when he acquires personal information from the customer which may include, for example, name, address contact information, desired cruise destination, household membership, cruise dates, and so forth. The customer profile may be stored in the customer database 232 and may be accessed, viewed, and updated as needed. This profile allows the agent to retain important personal information about the customer, thus improving the agent's ability to relate to the customer.

The brochure activity 1030 is performed by the agent when sending a customer additional information about one or more cruise lines in the form of a flyer, mailer, brochure, advertisement, or the like. This information may be presented in a hardcopy form that is sent to the customer through conventional methods such as using the postal service or electronically transmitting it to the customer using computer-based methods including email, web pages, facsimile, and other methods of directing the customer to the source of information. The cruise selling and booking system 110 facilitates the brochure activity 1030 by enabling the agent to view and use a customer's personal contact information stored in the customer profile and to ensure that the brochure information is received by the customer. Additionally, the cruise selling and booking system 110 may present the agent with a listing of the available brochure information related to individual cruise lines and further display a listing of those brochures which have already be requested/received by the customer.

A call activity 1040 is used by the cruise selling and booking system 110 to track and record calls made among the agent and customers. The call activity 1040 function of the cruise selling and booking system 110 may provide the agent with the name and contact information of the customer and a field in which the reason or purpose for the call may be recorded. The call activity 1040 may include numerous methods of customer interaction, such as, for example, phone calls, in-person consultations, and/or email messages. In each case, the interaction may be documented by the cruise selling and booking system 110 and may extend the agent ownership duration by a requisite period of time.

A quote activity 1050 is registered in the cruise selling and booking system 110 when the agent creates and/or retrieves a quote for the customer. The quote may be obtained electronically through the cruise selling and booking system 110 itself or may be acquired by other methods such as contacting the cruise line directly or looking up pricing information in a hardcopy listing. As with the call activity 1050, the cruise selling and booking system 110 may credit the agent with an assigned duration of ownership so as to allow the agent to pursue the customer further for the purposes of booking a cruise.

A lead activity 1060 is created when the agent begins the process of determining actual cruises which meet the customers preferences. In one embodiment, the cruise selling and booking system 110 provides functionality to guide the agent through the lead activity creation by providing a number of selectable criteria which include, cabin occupancy, sailing date preferences, cruise destination, cruise duration, cruise line selection, cruise ship selection, and other criteria which narrow the choices for cruises to a more manageable subset. The subset of cruises may then be viewed by the agent to provide the customer with detailed information about the specific cruises and to help the customer make a decision as to which cruise to book.

An option activity 1070 is created when the agent reserves space on a particular cruise line, ship, and sailing for the customer. The creation of an option activity 1070 indicates that the customer has expressed significant interest in one or more cruises and would like to hold space on the cruise ship to ensure that he will have a cabin available to book. In one embodiment, option activities 1070 hold or reserve space on the cruise line without financial obligation by the customer and have a variable length of expiration depending on the selected cruise line and particular sailing offered. Option activities 1070 typically remain open for a week or more and often represent one of the final customer activities prior to booking a cruise. In one embodiment, the cruise selling and booking system 110 allocates an extended duration of agent ownership so as to ensure that the agent who has generated the option activity will have sufficient time to work with the customer in order to book the cruise.

A booking activity 1080 occurs when the agent reserves a cabin on a particular cruise sailing and the customer provides a deposit or payment, in part or whole, so as to ensure that the reserved room cannot be acquired by other interested customers. The booking activity 1080 of the illustrated embodiment results in the permanent assignment of ownership of the customer to the agent who performed the booking activity 1080. In subsequent interactions, the customer will be assigned the same agent of record and no lapses in duration of activities will change the agent ownership status of the customer. It is recognized that in other embodiments, another duration of time may be associated with the booking activity 1080 such that the assignment of ownership is temporary rather than permanent.

The above-described activities are meant to illustrate the various types of activities that may be used by the cruise selling and booking system 110. It is recognized however, that in other embodiments, other types of activities may be included.

VI. Agent of Record Rules

Agent ownership may provide an additional incentive to the agent of record to book a cruise for a new customer by maintaining the agent of record association for a finite period of time. The period of time for which the agent remains the agent of record for the customer may depend upon the number and/or type of activities and interactions the agent has with the customer. In one embodiment, the agent may lose the status of agent of record for the customer should a period of time elapse without sufficient follow up activities, interactions, or customer bookings. This time lapse results in the agent of record expiring and the customer returning to an unassigned state (e.g., no agent of record) wherein other agents may establish a relationship with the customer. When a new agent (or the original agent) interacts with the customer in subsequent activities, an agent of record change creates a new agent of record for the customer in a similar manner as described above.

Table 1 illustrates example time periods for which an agent of record remains the agent of record. For example, if Agent A makes a phone call to Customer X on Jun. 1, 2000, Agent A will remain the agent of record until Jun. 10, 2000, at which point Customer X will be returned to the pool of available customers unless Agent A performs another activity that affects the expiration date. For example, if Agent A then gives Customer X a quote on Jun. 5, 2000, the agent of record is extended such that it will not expire until Jun. 15, 2000. Next, if Agent A books Customer X on a cruise, Agent A becomes Customer X's permanent agent of record.

TABLE 1

| Activity | Time Period |
| --- | --- |
| Customer Profile | Midnight of the Next Day |
| Brochure | 10 Days |
| Phone Call | 10 Days |
| Quotes | 10 Days |
| Leads | Midnight of the Next Day |
| Options | 10 Days |
| Booking | No Expiration |

Furthermore, Table 1 illustrates one set of possible activities and time periods and that other activities and/or time periods may be used. Furthermore, in one embodiment, the cruise selling and booking system 110 may include a rule module (not shown) which allows a user to enter in agent activities and set the time period associated with the activities. For example, a manager may use the rule module to state that if an agent creates a lead, the length of the agent record will last for fifteen days rather than ten as illustrated in Table 1. In addition, other information may be included in the rules.

For example, the rules may be based on different types of incentive programs, time periods, cruise line data, and so forth. For example, if an agent creates a quote within the first fifteen days of December 2000, the agent of record length may be for twenty days whereas it is otherwise ten days. In another example, an option for one cruise line 15 may expire after fifteen days, whereas an option for another cruise line may expire after eighteen days. In addition, the time period may be based on business days or may be based on calendar days. Thus, it is clear that a variety of rules, activities, time periods, and so forth may be used and that the invention is not limited to the examples provided herein.

VII. Customer States

In one embodiment, should the duration of ownership lapse without additional activities or bookings taking place, the customer profile and personal information are retained by the cruise selling and booking system 110, and the agent ownership status including the agent of record assignment are removed from the customer profile. The customer profile is further added to a pool of available customers and may be solicited to by other agents until a new activity or booking transaction for the customer takes place.

If the agent performs additional activities within the remaining duration of agent ownership, however, an extension of the duration of the agent ownership status is processed by the cruise selling and booking system 110. Activities which may be added to the customer profile include, for example, opening options, reservations, bookings, and other tasks which further indicate that the customer is moving forward towards booking a cruise with the agent. The cruise selling and booking system 110 grants the agent additional agent ownership time to preserve the agent's right to commission for booking the cruise should the customer make a decision in a timely manner. The extension of duration further provides the agent with incentive to pursue the customer in a timely manner so as to prevent other agents from having access to a customer which has expressed an interest in booking a cruise.

Subsequent to the addition of activities to the customer profile, an agent may further extend the duration of agent ownership by the addition of new activities within the duration in which the agent maintains his status as agent of record for the customer. In the instance where a customer booking occurs within the duration of agent ownership, the agent may be granted permanent ownership of the customer. The cruise selling and booking system 110 recognizes the activity of the agent booking the customer on the cruise, assigns the agent of record the appropriate commission consideration, and updates the customer profile to reflect the permanent status of the booking agent as the agent of record.

The permanent assignment of agent of record status provides a significant incentive to the agent to book customers on cruises. With each new customer booking, the agent builds a pool of customers to which he has exclusive booking rights. Should these customers book a cruise in the future, the permanent assignment of agent of record status ensures the current agent will receive the commission for the booking. Over time, the agent's customer pool of permanent ownership increases resulting in a more steady source of commission for the agent.

Customers with no active ownership due to lapse of the duration of ownership may be acquired by other agents who perform additional activities for the customer. The agent who performs the activities becomes the new agent of record and is subject to the same rules and ownership durations as the previous agent. Should the activity duration again lapse, the customer is returned to the available customer pool with an unassigned ownership status and the process repeats until the customer is successfully booked on a cruise and permanent ownership status is assigned.

In one embodiment, agent ownership directs the eligibility for sales commission resulting from customer booking. For example, a customer may have been previously assigned an agent of record through one of the above mentioned activities including calls, quotes, brochures, options, leads, or bookings. During the duration of agent ownership for the customer, which may be temporary or permanent, in one embodiment, another non-owning agent may interact with the customer and perform various activities including booking a cruise. The customer interaction with the non-owning agent however may not result in a transfer of ownership of the customer. Additionally, non-booking activities which the customer performs with the non-owning agent may not affect the duration of ownership of the current agent of record.

In one embodiment, should the customer decide to book a cruise with the assistance of the non-owning agent, the sales commission for the cruise booking is directed to the designated agent of record as recognized by the cruise selling and booking system 110. Thus, the cruise selling and booking system 110 ensures that bookings for customers with previously assigned agents of record result in directing the sales commission to the agent of record without regard for the agent which actually processed the booking. Thus, the agent ownership/agent of record features of the cruise selling and booking system 110 protect an agent's customers from other competing agents while they are properly owned.

Figure 11:
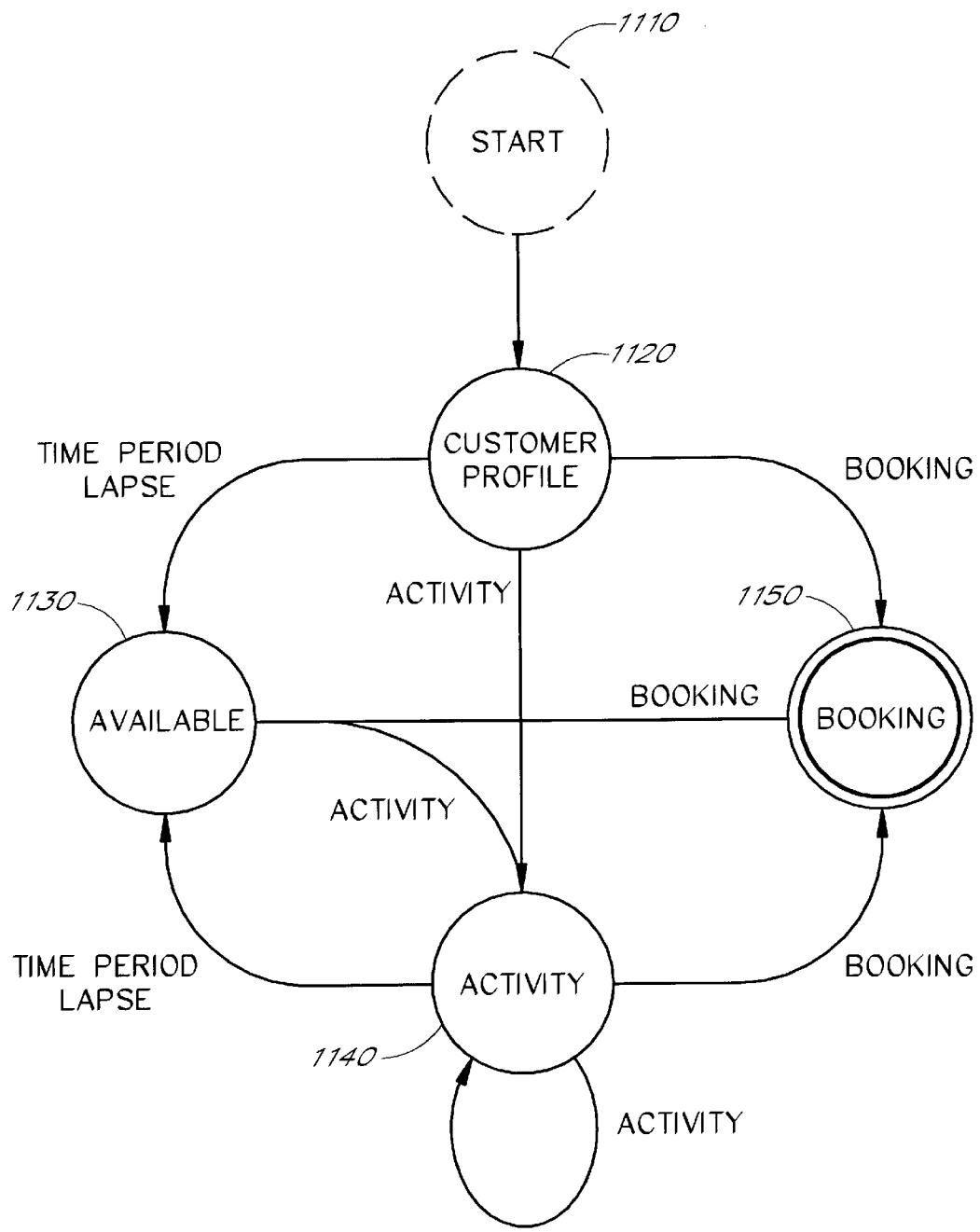
FIG. 11 illustrates a state diagram of one embodiment of customer states.

FIG. 11 illustrates sample customer/agent states in which a customer may exist based on the duration of time for which an agent maintains ownership of a customer. The state transitions are based in part on activities between the customer and agent that may set and/or extend the ownership duration. These activities may include, for example, the activities listed in Table 1.

Beginning at a start state (state 1110), the customer proceeds to a customer profile state (state 1120), when a new customer begins interacting with an agent. In the customer profile state, the customer's agent of record is set to "any." During the course of interaction, the agent may create a customer profile as discussed above. If the agent collects customer profile information, the customer transition to an activity state (state 1140) wherein the customer's agent of record is set to the agent's identification and the expiration date is set.

In one embodiment, using the rules of Table 1, the duration of agent ownership for a customer profile activity lasts until midnight the next day after the customer profile is created. The condition of agent ownership may be temporary in nature for the purpose of encouraging the agent to follow up with the customer in a timely manner and increase the booking rate for cruises. The cruise selling and booking system 110 maintains a record of the agent ownership status of the customer, designates the agent which has created the profile of the customer as the agent of record, and calculates the remaining time (duration) of ownership.

From the customer profile state (state 1120), the customer may transition in three ways. The ownership may lapse after the time period from the creation of the customer profile until midnight the next day; an agent may make an additional activity; and/or an agent may make a booking. If the time period lapses, then the customer transitions into an available state (state 1130), wherein the customer is available for any agent who wishes to try and obtain ownership of the customer by performing an activity. In one embodiment, the customer remains in the available state (state 1130) until an agent performs some activity or performs a booking, though in one embodiment, the customer may be removed from the available state (state 1130) if no one has made any activity or progress with the customer for a designated period of time.

A customer may also transition from the customer profile state (state 1120) to an activity state (state 1140) if the owning agent performs some type of activity, such as, for example, a brochure, a phone call, a quote, a lead, or an option. If the owning agent performs one or more of these activities, the customer then transitions to the activity state (state 1140) and remains in the activity state (state 1140) until the time expires, additional activity is performed resetting the expiration date, or a booking is performed.

The customer may also transition from the customer profile state (state 1120) to a booking state (state 1150) if the owning agent books the customer on a cruise. In one embodiment, using the rules of Table 1, the booking state (state 1150) is a final state. Once an agent has booked a customer on a cruise, the agent becomes the customer's permanent agent of record.

From the activity state (state 1140), the original agent may book the customer on a cruise and therefore transition to the booking state (state 1150). The agent may also perform additional activity and transition back into the activity state (state 1140) but with a new expiration date, or the agent may allow the ownership to lapse and therefore the customer would transition to the available state (state 1130). Once a customer has reached the available state (state 1140), the customer is available to receive any activity from any agent. If the customer receives an activity, the customer transitions to the activity state (state 1140) for the duration of the time period. In addition, from the available state (state 1130), an agent may book a customer on a cruise in which the customer then transitions to the final booking state (state 1150).

It is recognized that various states may be used in addition to or instead of the states discussed herein.

IV. Agent Ownership Displays

The cruise selling and booking system 110 may include displays that illustrate agent ownership, such as, for example, a main menu display and a customer search results display.

A. Main Menu Display

Figure 12:
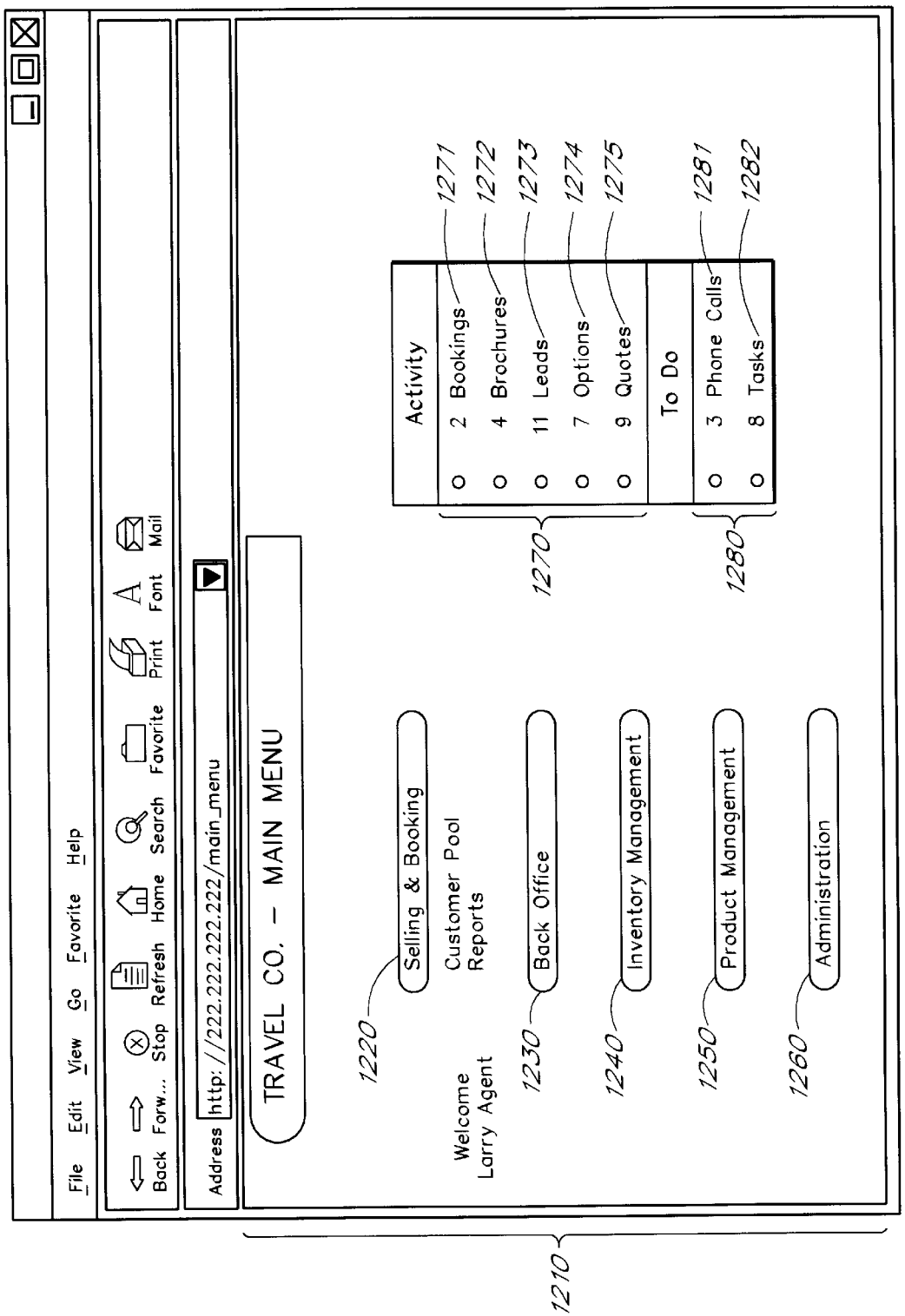
FIG. 12 illustrates one embodiment of a main menu display.

In one embodiment, upon successful login, the agent is directed to a main menu web page 1210, as illustrated in FIG. 12, which includes buttons or links for accessing the various features of the cruise selling and booking system 110. For example, the exemplary main menu display allows the agent to access features such as selling and booking 1220, back office 1230, inventory management 1240, product management 1250, and administrative features 1260. The main menu 1210 serves as a starting point for each of the features described above. In one embodiment, the agent may return to the main menu 1210 throughout the cruise selling and booking system process.

The main menu 1210 may also provide the agent with an activity listing 1270 which may include categories for bookings 1271, brochures 1272, leads 1273, options 1274, and quotes 1275. In FIG. 12, each of the categories has an associated numerical value that indicates the number of currently active customers which fall into the activity listing category. The purpose of the activity listing 1270 is to provide the agent with a quick summary of information for those customers he should contact. Each activity listing 570 enables the agent to access a listing of the customers who fall within the activities groups described above. In the illustrated embodiment, the agent may select any of the activity listings 1270 which will then direct him to a separate screen showing the details of the selected activity listing.

Additionally, the main menu may include a "to do" list 1280 which includes subcategories such as phone calls 1281 and tasks 1282. The "to do" list 1280 provides a reminder for activities for which the agent should initiate and follow up. In a similar manner to the activity listing 1270 above, the agent may select any of the items in the "to do" list 1280 in order to access a listing of customers who fall within the subcategories as well as information for contacting the customers.

B. Customer Search Results Display

Figure 13:
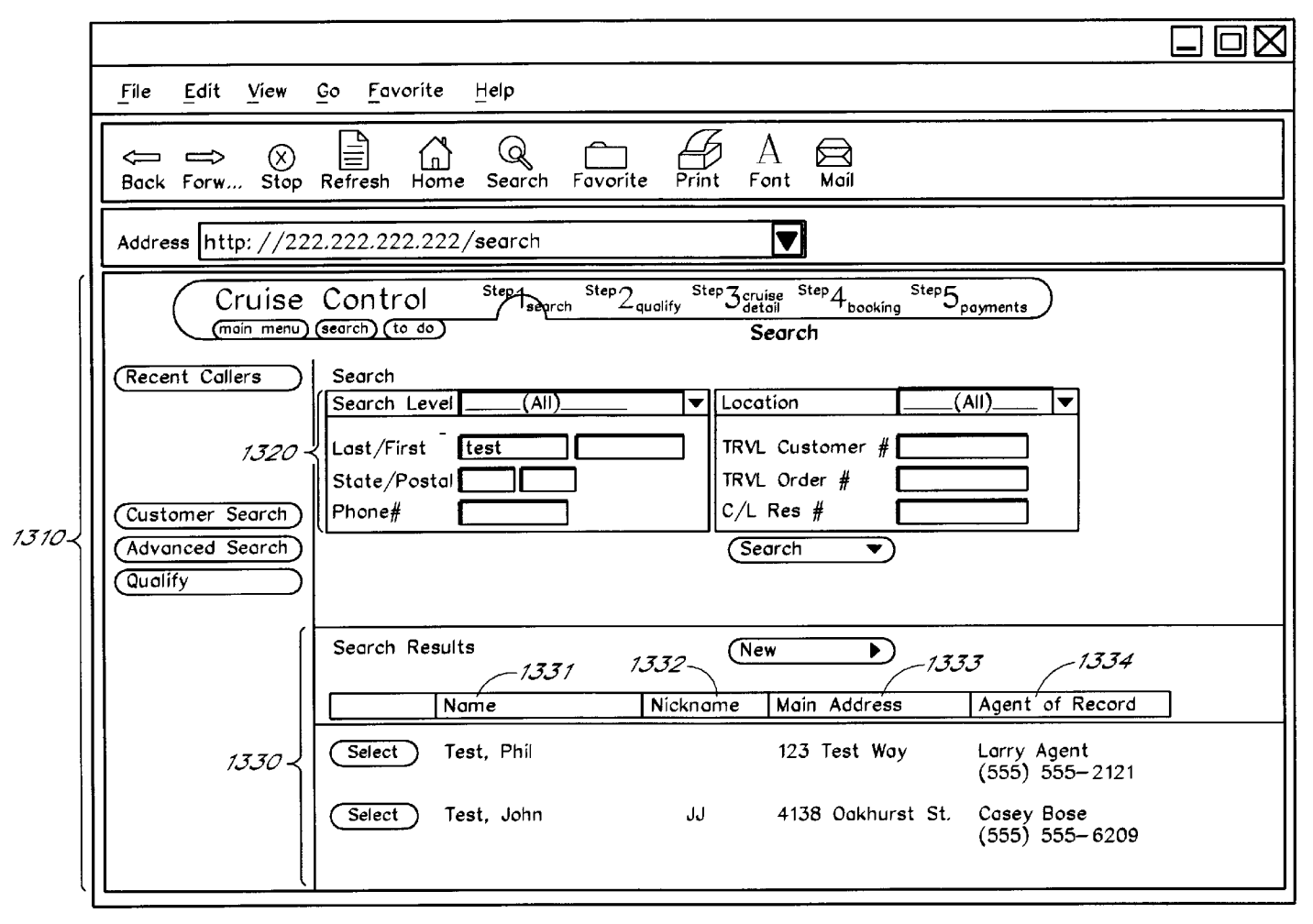

One embodiment of agent ownership wherein the cruise selling and booking system 110 may include functionality for searching for and displaying names of customers. As illustrated in FIG. 13, the cruise selling and booking system 110 may include a search web page 1310. In the exemplary search web page 1310, the agent may search for customers based on data entered in fields which correspond to the information stored in the customer database 232.

The search web page 1310 may be organized in a set of query fields 1320 that may be used by the agent to narrow the search criteria for identifying customers and may include fields identifying the customer name, contact information, or travel information useful in searching for and identifying customers. The search web page 1310 may also includes a search results section 1330 which displays the names and identifying information of customers matching the selected search criteria. Each search result displays a brief summary of identifying information, such as name 1331, nickname 1332, and main address 1333, and may be further selected to provide more detailed additional information in subsequent screens. As shown in FIG. 13, the agent of record 1334 for each customer may be additionally identified in the search results section 1330. By displaying the agent of record 1334 for a customer, the agent performing the search may determine the availability of a particular customer for soliciting cruise sailings and identify customers which he currently owns.

In one embodiment, the cruise selling and booking system 110 may limit the amount of information a non-owning agent may obtain about a customer. For example, an agent performing a search may not be able to obtain additional information about a customer beyond that shown in the search results section 1330 unless the agent of record status associated with the customer matches that of the agent currently logged onto the cruise selling and booking system 110. This feature is useful in preventing non-owning agents from obtaining additional customer information which might be used to contact customers owned by other agents. Thus, the cruise selling and booking system 110 limits the accessibility of detailed customer information to the designated agent of record during the time that a customer has an established agent ownership relationship.

V. Conclusion

While certain embodiments of the invention have been described, these embodiments have been presented by way of example only, and are not intended to limit the scope of the present invention. Accordingly, the breadth and scope of the present invention should be defined in accordance with the following claims and their equivalents.

What is claimed is:

1. A method for managing agent ownership of customers utilizing a cruise web server environment to electronically communicate via a data communications network with a plurality of remote users using web browser programs, the method comprising:

receiving and agent identifier that represents an agent from a remote user's web browser program;

receiving a customer identifier that represents a customer from the remote user's web browser program;

verifying that the customer is available for interaction with the agent by querying an electronic database of agent and customer information;

receiving an agent activity from the remote user's web browser program;

determining a time window for agent activity based at least upon at least one agent ownership rule, wherein the at least one agent ownership rule is stored in the electronic database;

creating an agent of record association between the agent and the customer wherein the agent is designated as the customer's agent of record for the allotted amount of time; and storing the agent of record association in the electronic database.

2. The method of claim 1, wherein the agent activity includes activity related to selling and booking cruise packages.

3. The method of claim 1, wherein the agent activity includes at least one of creating a customer profile, sending the customer a brochure, calling the customer, calculating a quote, creating a lead, creating an option, and booking a cruise package.

4. A method for changing an agent of record association between an agent and a customer utilizing a cruise web server environment to electronically communicate via a data communications network with a plurality of remote users using web browser programs, the method comprising:

receiving an agent identifier representing an agent from a remote user's web browser;

receiving a customer identifier representing a customer from the remote user's web browser;

receiving an activity that represents a communication between the agent and the customer from the remote user's web browser;

retrieving a customer record from an electronic database, wherein the customer record corresponds to the customer and the customer record includes an agent of record association;

setting the agent of record association to correspond to the agent represented by the agent identifier; and storing the agent of record association in the electronic database.

5. The method of claim 4, wherein the activity that represents a communication between the agent and the customer includes activity related to selling and booking cruise packages.

6. The method of claim 4, wherein the activity that represents a communication between the agent and the customer includes at least one of creating a customer profile, sending the customer a brochure, calling the customer, calculating a quote, creating a lead, creating an option, and booking a cruise package.

7. The method of claim 4, wherein the customer record includes an agent of record expiration date.

8. The method of claim 6 further comprising determining the agent of record expiration date for the agent of record association.

9. The method of claim 8, wherein determining the agent of record expiration date includes searching a rules database configured to store rules that define lengths of time associated with agent activities and using the rules to calculate the agent of record expiration date.

10. The method of claim 4, wherein the electronic database is a customer database.

11. The method of claim 4, wherein the electronic database is an agent database.

12. The method of claim 4, wherein the electronic database is an activity database.

13. The method of claim 4 further comprising:
    receiving a user identifier from the remote user's web browser program; and
    verifying that the user identifier corresponds to a user who has agent of record override privileges by querying the electronic database for agent of record override privileges.

14. A method of creating an agent of record association between an agent and a customer utilizing a cruise web server environment to electronically communicate via a data communications network with a plurality of remote users using web browser programs, the method comprising:
    receiving an agent identifier representing an agent from a remote user's web browser program;
    receiving customer information about a customer from the remote user's web browser program;
    creating a customer record;
    creating an agent of record association between the customer and the agent; and
    storing the customer record in an electronic database.

15. The method of claim 14, wherein the customer record includes an agent of record field.

16. The method of claim 15, wherein creating an agent of record association includes setting the agent of record field to the agent identifier.

17. The method of claim 14 further comprising setting an agent of record expiration date based at least upon a customer profile creation activity.

18. The method of claim 15, wherein storing the customer record in a electronic database includes storing the agent identifier in the agent of record field of the customer record.

19. The method of claim 14, wherein the electronic database includes an agent database.

20. The method of claim 14, wherein the electronic database includes a customer database.

21. The method of claim 14, wherein the electronic database includes an agent database and a customer database.

22. The method of claim 14, wherein the customer information includes at least one of, name, address contact information, desired cruise destination, household membership, and cruise dates.

23. A method for managing agent ownership of customers utilizing a cruise web server environment to electronically communicate via a data communications network with a plurality of remote users using web browser programs, the method comprising:
    means for receiving and agent identifier that represents an agent from a remote user's web browser program;
    means for receiving a customer identifier that represents a customer from the remote user's web browser program;
    means for verifying that the customer is available for interaction with the agent by querying an electronic database of agent and customer information;
    means for receiving an agent activity from the remote user's web browser program;
    means for determining a time window for agent activity based at least upon at least one agent ownership rule, wherein the at least one agent ownership rule is stored in the electronic database;
    means for creating an agent of record association between the agent and the customer wherein the agent is designated as the customer's agent of record for the allotted amount of time; and
    means for storing the agent of record association in the electronic database.

* * * * *